(12) United States Patent
Fukuchi et al.

(10) Patent No.: US 7,769,491 B2
(45) Date of Patent: Aug. 3, 2010

(54) OBSTACLE AVOIDING APPARATUS, OBSTACLE AVOIDING METHOD, OBSTACLE AVOIDING PROGRAM, AND MOBILE ROBOT APPARATUS

(75) Inventors: Masaki Fukuchi, Tokyo (JP); Steffen Gutmann, Tokyo (JP)

(73) Assignee: Sony Corporation, Tokyo (JP)

( * ) Notice: Subject to any disclaimer, the term of this patent is extended or adjusted under 35 U.S.C. 154(b) by 1191 days.

(21) Appl. No.: 11/363,178

(22) Filed: Feb. 28, 2006

(65) Prior Publication Data
US 2006/0241827 A1    Oct. 26, 2006

(30) Foreign Application Priority Data
Mar. 4, 2005    (JP)    ............................ P2005-061693

(51) Int. Cl.
*G05B 19/18*    (2006.01)
(52) U.S. Cl. .................. 700/253; 700/245; 700/254; 700/255; 700/258; 700/259; 701/1; 701/300; 701/301; 382/106; 382/153; 382/154
(58) Field of Classification Search ........... 700/25–255, 700/258–259; 701/1, 300–301; 382/106, 382/153–154
See application file for complete search history.

(56) References Cited

U.S. PATENT DOCUMENTS

| 7,349,223 B2* | 3/2008 | Haemer et al. | 361/767 |
|---|---|---|---|
| 7,379,562 B2* | 5/2008 | Wilson | 382/103 |
| 7,382,471 B2* | 6/2008 | Franke et al. | 356/604 |
| 7,386,163 B2* | 6/2008 | Sabe et al. | 382/153 |

(Continued)

FOREIGN PATENT DOCUMENTS

JP    2003-266345    9/2003

OTHER PUBLICATIONS

Cohen et al., Inference of 3D Human Body Posture from Multiple Cameras for Vision-Based User Interface, USC, pp. 1-6.*

(Continued)

*Primary Examiner*—Khoi Tran
*Assistant Examiner*—Nikhil Sriraman
(74) *Attorney, Agent, or Firm*—Finnegan, Henderson, Farabow, Garrett & Dunner, L.L.P.

(57) ABSTRACT

The present invention provides an obstacle avoiding apparatus, an obstacle avoiding method, an obstacle avoiding program, and a mobile robot apparatus that can accurately model a robot apparatus and plan a highly precise moving route for the robot apparatus that avoids obstacles. The obstacle avoiding apparatus, to be used for a mobile robot apparatus to avoid obstacles, includes an obstacle environment map drawing section that divides the range of height from the reference surface for the mobile robot apparatus to move thereon to the height of the mobile robot apparatus into a plurality of layers corresponding to predetermined respective ranges of height and draws obstacle environment maps, each showing the condition of being occupied by one or more than one obstacles existing in the corresponding layer, and a route planning section that plans a route for the robot apparatus to move along according to an enlarged environment map prepared by enlarging the area occupied by the obstacle or obstacles in the obstacle environment maps as a function of the cross sectional profile of the mobile robot apparatus in each of the layers.

19 Claims, 22 Drawing Sheets

U.S. PATENT DOCUMENTS

| | | | |
|---|---|---|---|
| 7,507,948 B2* | 3/2009 | Park et al. | 250/221 |
| 7,519,457 B2* | 4/2009 | Hasegawa et al. | 701/23 |
| 7,579,803 B2* | 8/2009 | Jones et al. | 318/567 |
| 2001/0018640 A1* | 8/2001 | Matsunaga | 701/301 |
| 2003/0007159 A1* | 1/2003 | Franke et al. | 356/604 |
| 2004/0013295 A1* | 1/2004 | Sabe et al. | 382/153 |
| 2005/0000543 A1* | 1/2005 | Taylor et al. | 134/18 |
| 2005/0131581 A1* | 6/2005 | Sabe et al. | 700/245 |
| 2006/0082787 A1* | 4/2006 | Franke et al. | 356/604 |
| 2006/0103854 A1* | 5/2006 | Franke et al. | 356/603 |
| 2006/0155436 A1* | 7/2006 | Matsunaga | 701/23 |
| 2006/0204040 A1* | 9/2006 | Freeman et al. | 382/107 |
| 2006/0241827 A1* | 10/2006 | Fukuchi et al. | 701/23 |
| 2006/0293792 A1* | 12/2006 | Hasegawa et al. | 700/245 |
| 2007/0019181 A1* | 1/2007 | Sinclair et al. | 356/4.01 |
| 2007/0192910 A1* | 8/2007 | Vu et al. | 901/17 |
| 2007/0198128 A1* | 8/2007 | Ziegler et al. | 700/245 |
| 2007/0267570 A1* | 11/2007 | Park et al. | 250/221 |
| 2007/0282484 A1* | 12/2007 | Chung et al. | 700/245 |
| 2009/0021351 A1* | 1/2009 | Beniyama et al. | 340/10.1 |
| 2009/0141938 A1* | 6/2009 | Lim et al. | 382/103 |
| 2009/0148034 A1* | 6/2009 | Higaki et al. | 382/153 |
| 2009/0177323 A1* | 7/2009 | Ziegler et al. | 700/259 |
| 2009/0228166 A1* | 9/2009 | Durkos et al. | 701/26 |

OTHER PUBLICATIONS

Arkin, Planning to Behave: A Hybrid Deliberative/Reactive Robot Control Architecture for Mobile Manipulation, Georgia Institute of Technology, pp. 1-8.*

A Hierarchical Shape Representation for Vision-Guided Robotics, Martinez-Salvador; AAAI, pp. 1-5.*

* cited by examiner

OBSTACLE AVOIDING APPARATUS, OBSTACLE AVOIDING METHOD, OBSTACLE AVOIDING PROGRAM, AND MOBILE ROBOT APPARATUS

CROSS REFERENCE TO RELATED APPLICATIONS

This invention contains subject matter related to Japanese Patent Application JP 2005-061693 filed in the Japanese Patent Office on Mar. 4, 2005, the entire contents of which being incorporated herein by reference.

BACKGROUND OF THE INVENTION

1. Field of the Invention

This invention relates to an obstacle avoiding apparatus, an obstacle avoiding method, an obstacle avoiding program and a mobile robot apparatus that plan a moving route on the basis of an obstacle environment map prepared by acquiring information in the environment and avoid obstacles.

2. Description of the Related Art

Unlike industrial robots, autonomous type robot apparatus can autonomously move according to the conditions of the surrounding and the internal conditions of the robot apparatus itself. For example, such a robot apparatus can detect external obstacles and autonomously move by planning a moving route that avoids the obstacles.

Path finding studies have been conducted for long as typical studies of artificial intelligence along with problems of computational geometry such as traveling salesman problem and interference check. Path finding for a floating object in a known environment such as the so-called piano mover's problem of geometrically determining the route along which a piano is moved out from a small room having an intricate geometry may be a typical problem. Many techniques have been proposed for benchmark problems for the efficiency of computational geometry and search algorithms have been proposed in this field of study.

For example, Patent Document 1 [Jpn. Pat. Appln. Laid-Open Publication No. 2003-266345] proposes a path finding technique for avoiding obstacles for a biped robot apparatus. According to the Patent Document 1, a moving route is planned for a robot apparatus so as not to interfere with obstacles by modeling the robot apparatus by means of cylinders and using an occupancy grid that shows the profiles of obstacles as obstacle environment map.

When planning a route for getting to goal G from current position R of a robot apparatus, for instance, firstly an obstacle environment map is prepared as illustrated in FIG. 1A. The obstacle environment map shows the obstacles found within the space on the floor where the robot apparatus is expected to move from the floor level to the height of a cylinder 301 formed by modeling the robot apparatus and also the holes cut down from the floor. In FIG. 1A, the black cells indicate the regions occupied by obstacles and the white cells indicate the regions where the robot apparatus can move freely. Then, the robot apparatus is made equivalent to the contracted one at the current position R as shown in FIG. 1B by enlarging the regions occupied by obstacles in the environment map of FIG. 1A by the half diameter of the cylinder 301. Thus, it is possible to check the interferences of the robot apparatus with the obstacles that can take place by checking the overlaps of the model and the enlarged obstacle regions. As a result, it is possible to plan routes that avoid obstacles as indicated by arrows in FIG. 1B by means of a technique called A* search.

SUMMARY OF THE INVENTION

When a robot apparatus is reduced to a simple cylindrical model as described above, there arises a modeling error because the cylindrical model is made to show a large half diameter so that the robot apparatus may be contained in the model and the regions occupied by obstacles in the environment map by the half diameter of the cylindrical model.

For example, an environment map as illustrated in FIG. 3A can be prepared when there is an obstacle 302 having a part A lower than the trunk section of the robot apparatus so that one of the arms of the robot apparatus can pass through the part A as shown in FIG. 2. However, the part A that is lower than the trunk section of the robot apparatus is recognized as obstacle as shown in FIG. 3B when the obstacle 302 having a low part A, which is a shaded area, is enlarged by the half-diameter of a cylindrical model 303 of the robot apparatus.

The present invention proposes a solution for this problem, and it is desired to provide an obstacle avoiding apparatus, an obstacle avoiding method, an obstacle avoiding program and a mobile robot apparatus that can accurately model a robot apparatus and plan a highly precise moving route for the robot apparatus that avoids obstacles.

According to the present invention, there is provided an obstacle avoiding apparatus to be used for a mobile robot apparatus to avoid obstacles, the apparatus including: an obstacle environment map drawing means for dividing the range of height from the reference surface for the mobile robot apparatus to move thereon to the height of the mobile robot apparatus into a plurality of layers corresponding to predetermined respective ranges of height and drawing obstacle environment maps, each showing the condition of being occupied by one or more than one obstacles existing in the corresponding layer; and a route planning means for planning a route for the robot apparatus to move along according to an enlarged environment map prepared by enlarging the area occupied by the obstacle or obstacles in the obstacle environment maps as a function of the cross sectional profile of the mobile robot apparatus in each of the layers.

According to the present invention, there is also provided an obstacle avoiding method to be used for a mobile robot apparatus to avoid obstacles, the method including: an obstacle environment map drawing step of dividing the range of height from the reference surface for the mobile robot apparatus to move thereon to the height of the mobile robot apparatus into a plurality of layers corresponding to predetermined respective ranges of height and drawing obstacle environment maps, each showing the condition of being occupied by one or more than one obstacles existing in the corresponding layer; and a route planning step of planning a route for the robot apparatus to move along according to an enlarged environment map prepared by enlarging the area occupied by the obstacle or obstacles in the obstacle environment maps as a function of the cross sectional profile of the mobile robot apparatus in each of the layers.

According to the present invention, there is also provided an obstacle avoiding program to be used for a mobile robot apparatus to avoid obstacles, the program including: an obstacle environment map drawing step of dividing the range of height from the reference surface for the mobile robot apparatus to move thereon to the height of the mobile robot apparatus into a plurality of layers corresponding to predetermined respective ranges of height and drawing obstacle environment maps, each showing the condition of being occupied by one or more than one obstacles existing in the corresponding layer; and a route planning step of planning a route for the robot apparatus to move along according to an enlarged environment map prepared by enlarging the area occupied by the obstacle or obstacles in the obstacle environment maps as a function of the cross sectional profile of the mobile robot apparatus in each of the layers.

According to the present invention, there is also provided a mobile robot apparatus adapted to avoid obstacles, the robot apparatus having: an obstacle environment map drawing means for dividing the range of height from the reference surface for it to move thereon to its own height into a plurality of layers corresponding to predetermined respective ranges of height and drawing obstacle environment maps, each showing the condition of being occupied by one or more than one obstacles existing in the corresponding layer; and a route planning means for planning a route for it to move along according to an enlarged environment map prepared by enlarging the area occupied by the obstacle or obstacles in the obstacle environment maps as a function of the cross sectional profile of itself in each of the layers.

Thus, according to the present invention, it is possible to highly accurately and efficiently avoid obstacles by dividing the range of height from the reference surface for a robot apparatus to move thereon to the height of the robot apparatus into a plurality of layers corresponding to predetermined respective ranges of height and drawing obstacle environment maps, each showing the condition of being occupied by one or more than one obstacles existing in the corresponding layer and planning a route for the robot apparatus to move along according to an enlarged environment map prepared by enlarging the area occupied by the obstacle or obstacles in the obstacle environment maps as a function of the cross sectional profile of the robot apparatus in each of the layers.

DETAILED DESCRIPTION OF THE PREFERRED EMBODIMENTS

Now, a preferred embodiment the present invention will be described in greater detail by referring to the accompanying drawings. The embodiment is realized by applying an obstacle avoiding apparatus to a biped robot apparatus.

Figure 4:
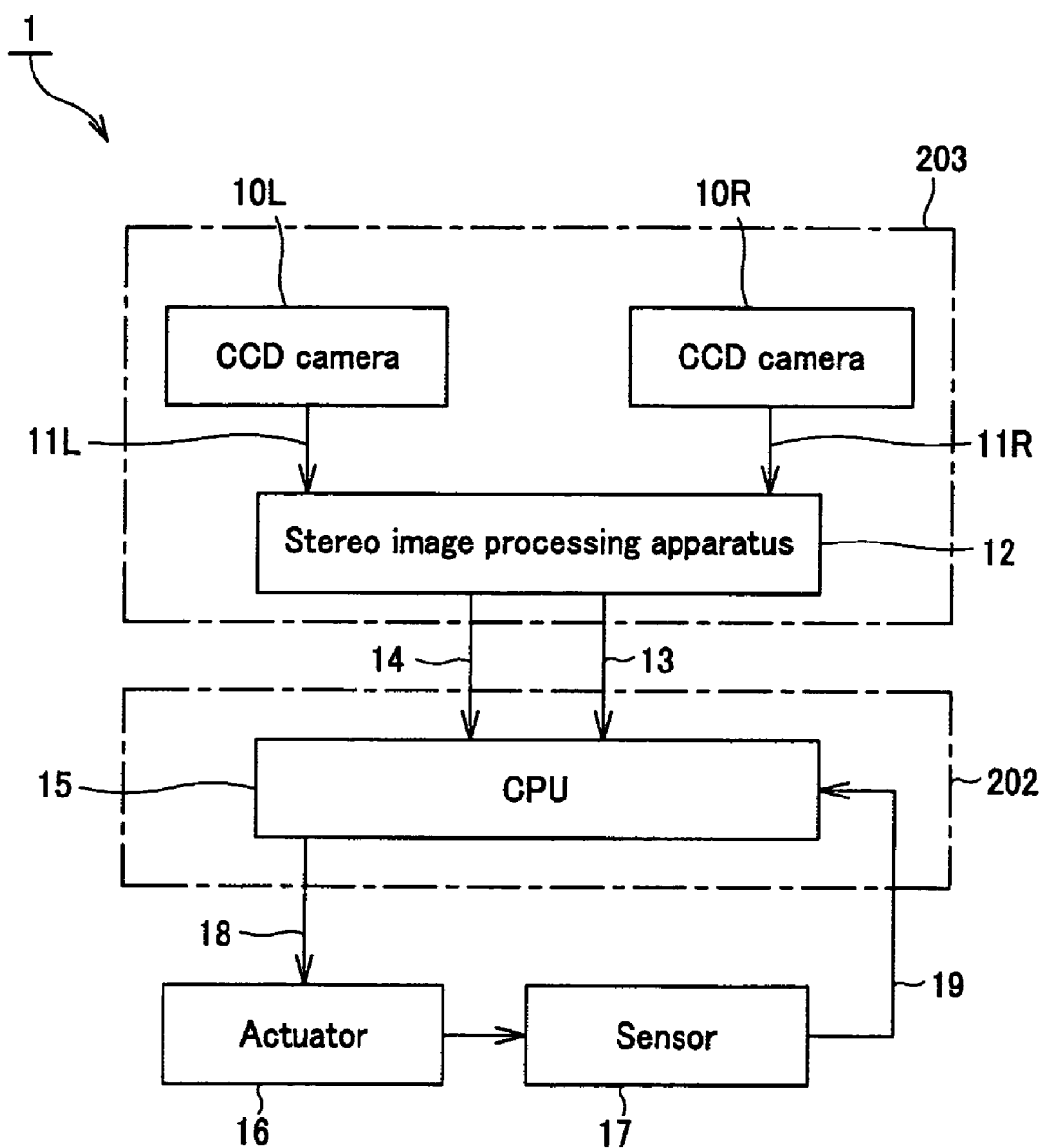
FIG. 4 is a schematic block diagram of an embodiment of robot apparatus according to the present invention.

FIG. 4 is a schematic block diagram of the robot apparatus 1. The head unit 203 of the robot apparatus 1 is equipped with a pair of CCD cameras 10R, 10L. A stereo image processing apparatus 12 is arranged behind the CCD cameras 10R, 10L (of which R and L are suffixes representing right and left respectively). A right eye image 11R and a left eye image 11L picked up by the pair of CCD cameras are input to the stereo image processing apparatus 12. The stereo image processing apparatus 12 computationally processes the disparity data (distance data) of the images 11R and 11L and computationally produces a color image (YUV: luminance Y, color difference UV) 13 and a disparity image (YDR: luminance Y, disparity D, reliability R) 14 for each frame in an alternating manner. The term "disparity" as used herein refers to the difference of a point in the space mapped on the left eye and the same point mapped in the space mapped on the right eye that varies as a function of the distances from the cameras.

The color image 13 and the disparity image 14 are input to a CPU (control section) 15 contained in a trunk section 202 of the robot apparatus 1. Each of the joints of the robot apparatus 1 is equipped with one or more than one actuators 16 and supplied with a control signal 18 from the CPU 15 as a command so that the actuator is driven by a corresponding motor according to the values of the command. Each of the joints (or actuators) is also equipped with a potentiometer and the rotary angle of the joint is fed to the CPU 15 when the motor is or the motors are driven for the joint. The sensors 17 including the potentiometers fitted to the actuators 16, the touch sensors fitted to the soles and the gyro sensors fitted to the trunk section 202 observe the current conditions of the robot apparatus 1 including the angles of the joints, ground touching information and attitude information, which current conditions are then output to the CPU 15 as sensor data 19. The CPU 15 receives the color image 13 and the disparity image 14 from the stereo image processing apparatus 12, and the sensor data 19 such as the angles of the joints of the actuators 16 so as to control the behavior of the robot apparatus 1 by way of control signals 18.

The software of this embodiment of robot apparatus 1 is configured on the basis of units of objects and adapted to recognize the current position, the quantity of movement, the surrounding obstacles and environment maps of the robot apparatus 1 and execute various recognition processes for outputting a string of actions that the robot apparatus 1 has to eventually take.

Figure 5:
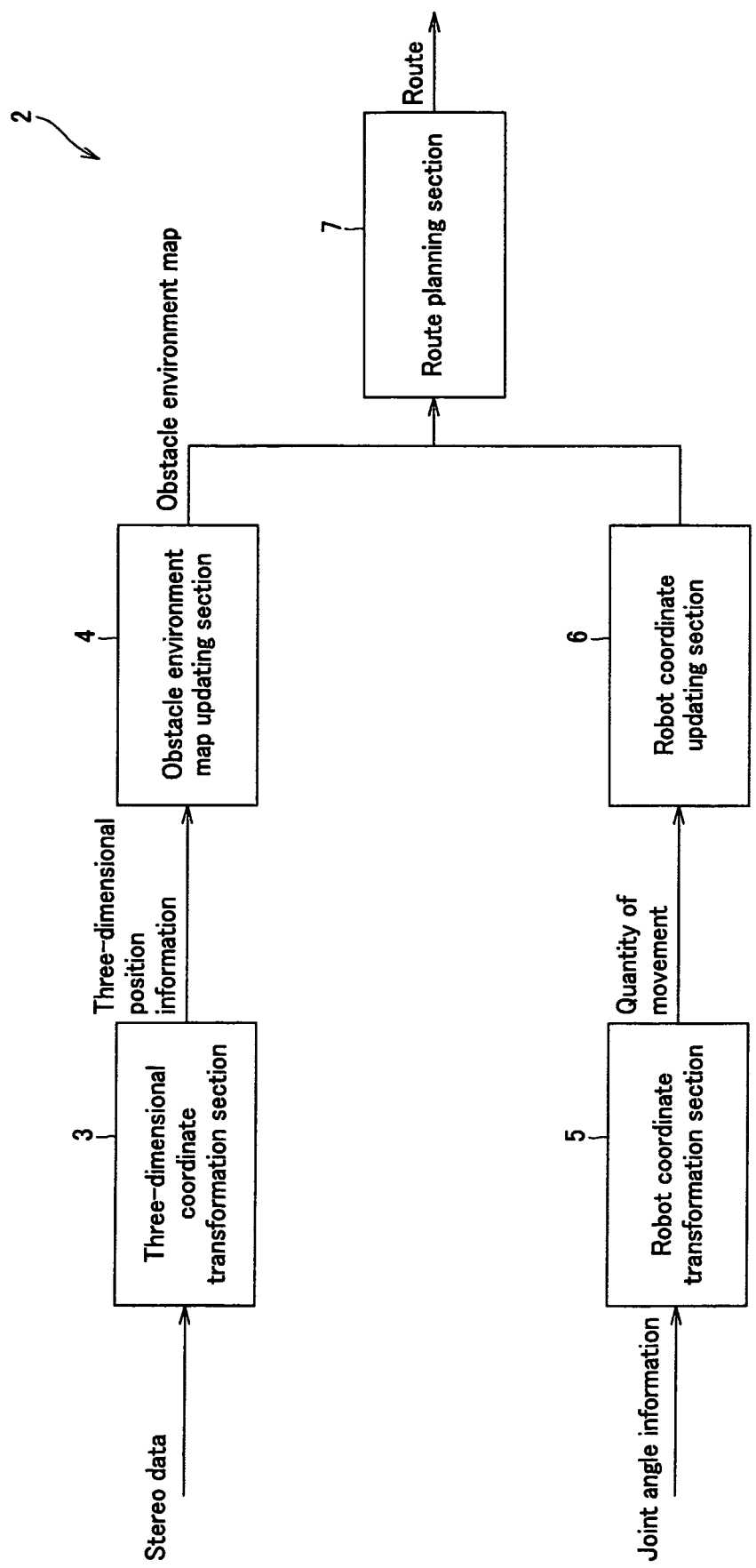
FIG. 5 is a schematic functional block diagram of an embodiment of obstacle avoiding apparatus according to the present invention.

FIG. 5 is a schematic functional block diagram of obstacle avoiding apparatus 2 mounted in the robot apparatus 1. The obstacle avoiding apparatus 2 is arranged in the CPU 15 so as to operate according to an obstacle avoiding program.

The obstacle avoiding apparatus 2 includes a three-dimensional coordinate transformation section 3, an obstacle environment map updating section (update layered occupancy grid) 4, a robot coordinate transformation section (kinematics) 5, a robot coordinate updating section (update robot pose) 6 and a route planning section (path planner) 7.

The three-dimensional coordinate transformation section 3 transforms the stereo coordinate data input from the CCD cameras 10R, 10L into reference coordinates of the robot apparatus 1. More specifically, a plane detector recognizes a plurality of planes existing in the environment by comparing the image input from the two cameras including the left camera and the right camera that correspond to the two eyes of a human being for each pixel and its vicinity, estimating the distance from the robot apparatus to each object in the image and detecting planes, transforms them into reference coordinates and outputs three-dimensional position information.

Figure 6:
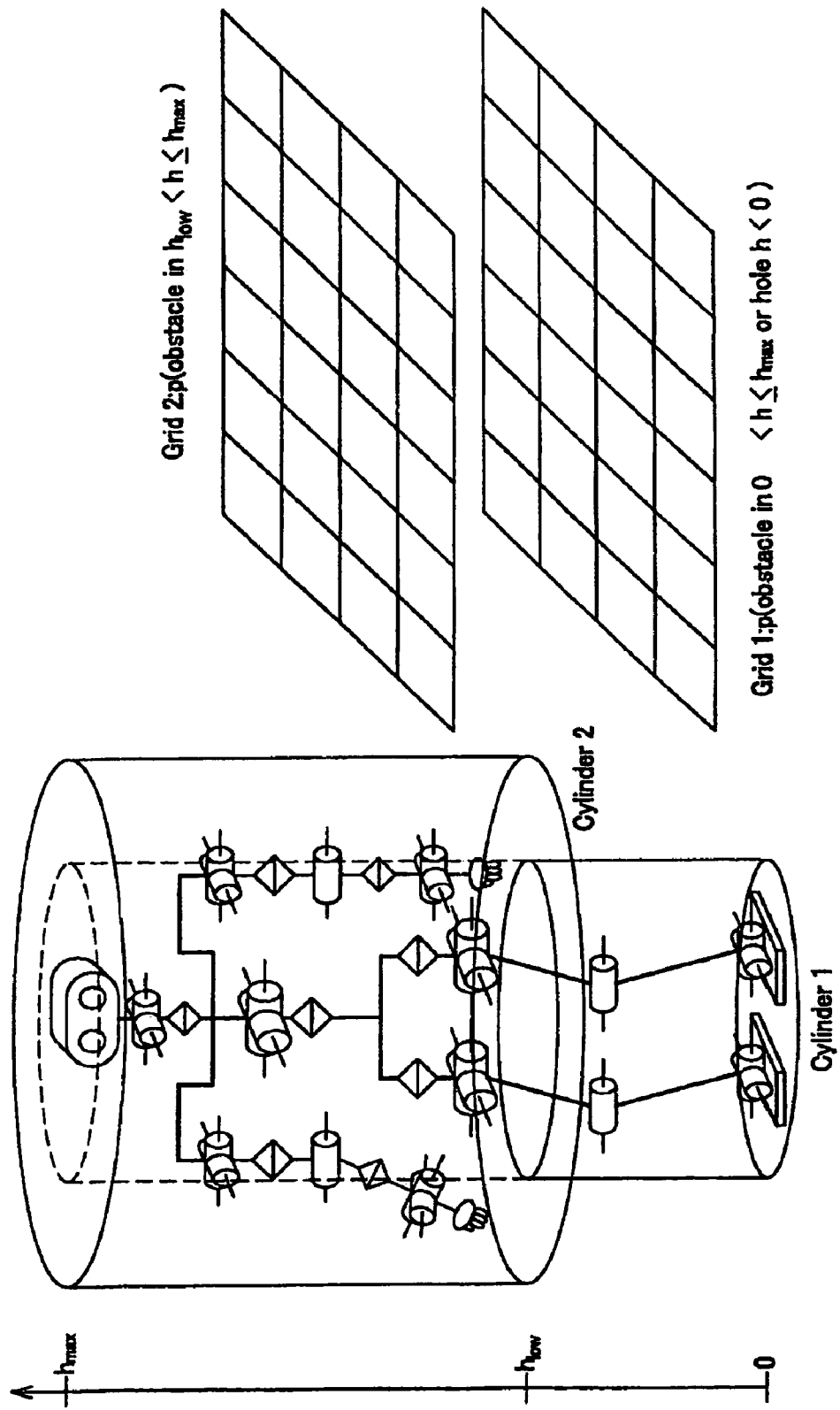
FIG. 6 is a schematic illustration of the cylinders formed by modeling the embodiment of robot apparatus of FIG. 4.

The obstacle environment map updating section 4 draws an obstacle environment map and updates it according to the three-dimensional position information. As shown in FIG. 6, the obstacle environment map is prepared by forming a model for the robot apparatus 1 as shown in FIG. 6 by means of synthetically combed cylinders and then draws a grid that is an obstacle environment map for each of the cylinders. The grid shows if there is an obstacle or are obstacles within the range of height from the bottom surface to the top surface of each of the cylinders of the model.

For example, the robot apparatus 1 illustrated in FIG. 6 is modeled by means of a cylinder 1 having a height extending from level 0 to level $h_{max}$ and another cylinder having a height extending from level $h_{low}$ to level $h_{max}$. The cylindrical model has a range of height from the floor level to the height of the robot apparatus 1 and includes a cylinder 1 having a range of height equal to that of the robot apparatus 1 and a half diameter that is sufficiently large for containing the cross section of the leg section that includes a movable region and a cylinder 2 having a range of height that includes the trunk section and the head section and a half diameter that is larger than the half diameter of the cylinder 1 and sufficiently large containing the arm sections having respective movable regions. The central axes of the cylinders agree with each other. The grid 1 that corresponds to the cylinder 1 shows an obstacle environment in the range of height that extends from level 0 to level $h_{max}$, whereas the grid 1 that corresponds to the cylinder 2 shows an obstacle environment in the range of height that extends from level $h_{low}$ to level $h_{max}$. As will be described in greater detail hereinafter, the grid 1 may be made to show the environmental conditions below the floor level where the robot apparatus moves.

Each of the cells of the grids is provided with the probability of being occupied by an object of the cell. The occupancy probability of each cell is modified according to the observation data acquired by the robot apparatus 1. A threshold value is provided for the occupancy probability and the conditions of the environment are expressed according to if the occupancy probability is greater than the threshold value or not.

The obstacle environment map updating section 4 executes an empty process on the cell that corresponds to the x-coordinate and the y-coordinate of the point of observation p when the point of observation is located on or near the floor, whereas it executes an occupied process on the cell that corresponds to the x-coordinate and the y-coordinate of the point of observation p when the point of observation is not located on or near the floor.

Each of the grids holds the existence probability of an obstacle for cell C (the probability by which the cell C is occupied by an obstacle) and an empty process or an occupied process is executed on each cell statistically. An empty process is a process that reduces the existence probability of an obstacle, whereas an occupied process is a process that raises the existence probability of an obstacle. Bayes' update rule is used in this embodiment.

More specifically, the occupancy probability is reduced by an empty process by means of formula (1) shown below, whereas the occupancy probability is raised by an occupied process by means of formula (2) shown below. In the formula (1), p(c) that represents the occupancy probability of cell C shows the probability of cell C of being in an "occupied" condition. In the formula (1) and the formula (2), the probability p(occ|...), p(empty|...) of being occupied or not of cell C is a predetermined threshold value th.

[formula 1]
$$p(c) \leftarrow p(c \mid empty) = \frac{p(empty \mid c)p(c)}{p(empty \mid c)p(c) + p(empty \mid \neg c)p(\neg c)} \quad (1)$$

[formula 2]
$$p(c) \leftarrow p(c \mid occ) = \frac{p(occ \mid c)p(c)}{p(occ \mid c)p(c) + p(occ \mid \neg c)p(\neg c)} \quad (2)$$

In this way, the existence probability of an obstacle computed for each cell to update the obstacle environment map.

The robot coordinate transformations section 5 leads out the quantity of movement (odometry) of the robot apparatus 1 according to the joint angle information in the inside of the robot apparatus 1.

The robot coordinate updating section 6 updates the position and the posture of the robot apparatus 1 according to the quantity of movement. Specifically, the update is performed by integrating the quantity of movement in the direction of time.

The route planning section 7 plans the route of movement of the robot apparatus 1 according to the obstacle environment map. A technique of so-called A* search for minimizing the cost of the entire route is used for the route plan.

Figure 7:
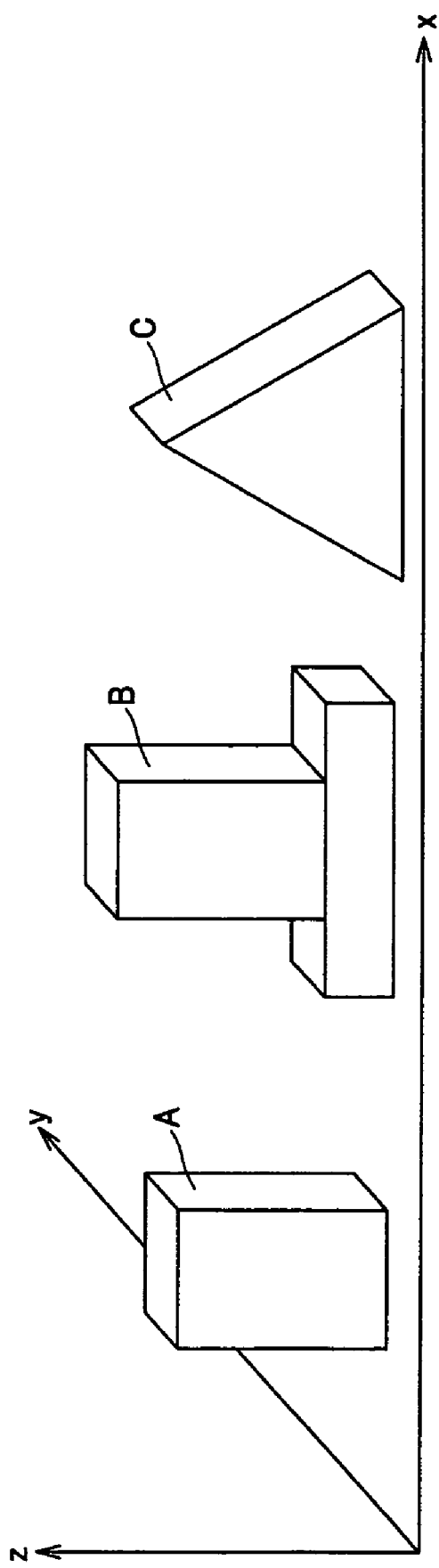
FIG. 7 is a schematic illustration of obstacles.

Now, an application of the above-described obstacle avoiding apparatus 2 to a situation where obstacles as shown in FIG. 7 exist will be described below. Referring to FIG. 7, obstacle A is an obstacle that is lower than the level $h_{low}$, that is equal to the lowest level of the range of height of the cylinder 2 of the model of the robot apparatus 1 as shown in FIG. 6. Obstacle B is an obstacle that has a part higher than the level $h_{low}$, that is equal to the lowest level of the range of height of the cylinder 2 as shown in FIG. 6. Obstacle C is an obstacle having a triangular profile that has a part lower than the level $h_{low}$ that is equal to the lowest level of the range of height of the cylinder 2 as shown in FIG. 6.

Figure 8:
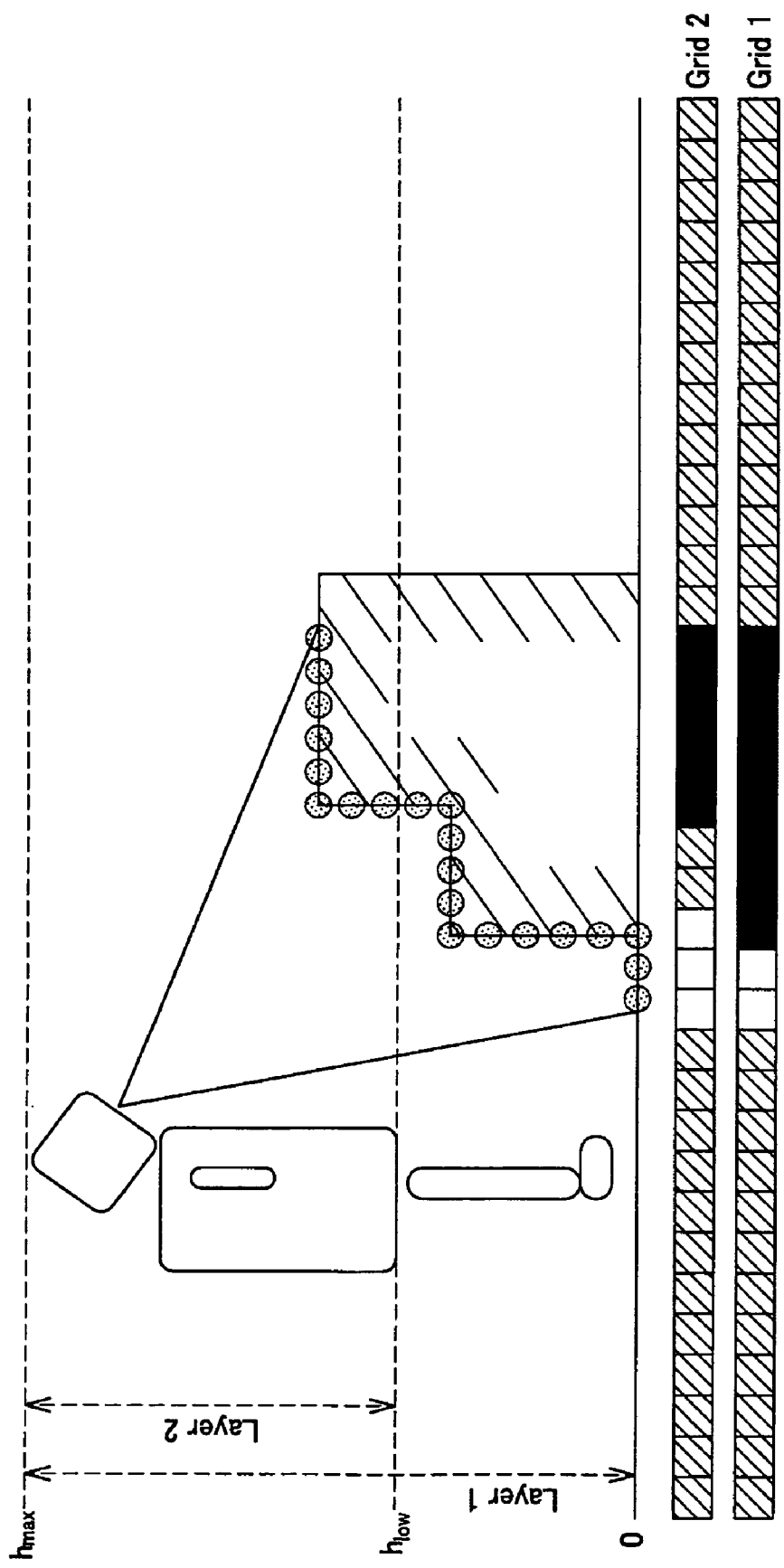
FIG. 8 is a schematic illustration of layers that correspond to the cylinders.

FIG. 8 is a schematic illustration of the relationship between the obstacles illustrated in FIG. 7 and the grids. In the instance of the model of the robot apparatus 1 that is formed by using two cylinders as shown in FIG. 6, the model is divided into two different layers that correspond to the ranges of height of the cylinders as shown in FIG. 8. The obstacle in the layer 1 is shown in the grid 1, whereas the obstacle in the layer 2 is shown in the grid 2.

In the grid 1 and the grid 2, a white cell indicates a free area where the robot apparatus 1 can freely move, whereas a black cell indicates an obstacle and a grey cell indicates an unobserved area. When the point of observation is located in the layer 2, it is also found in the layer 1 so that both the grid 1 and the grid 2 are updated. When, on the other hand, the point of observation is located only in the layer 1 and hence at a level lower than the layer 2, only the grid 1 is updated.

Figure 9:
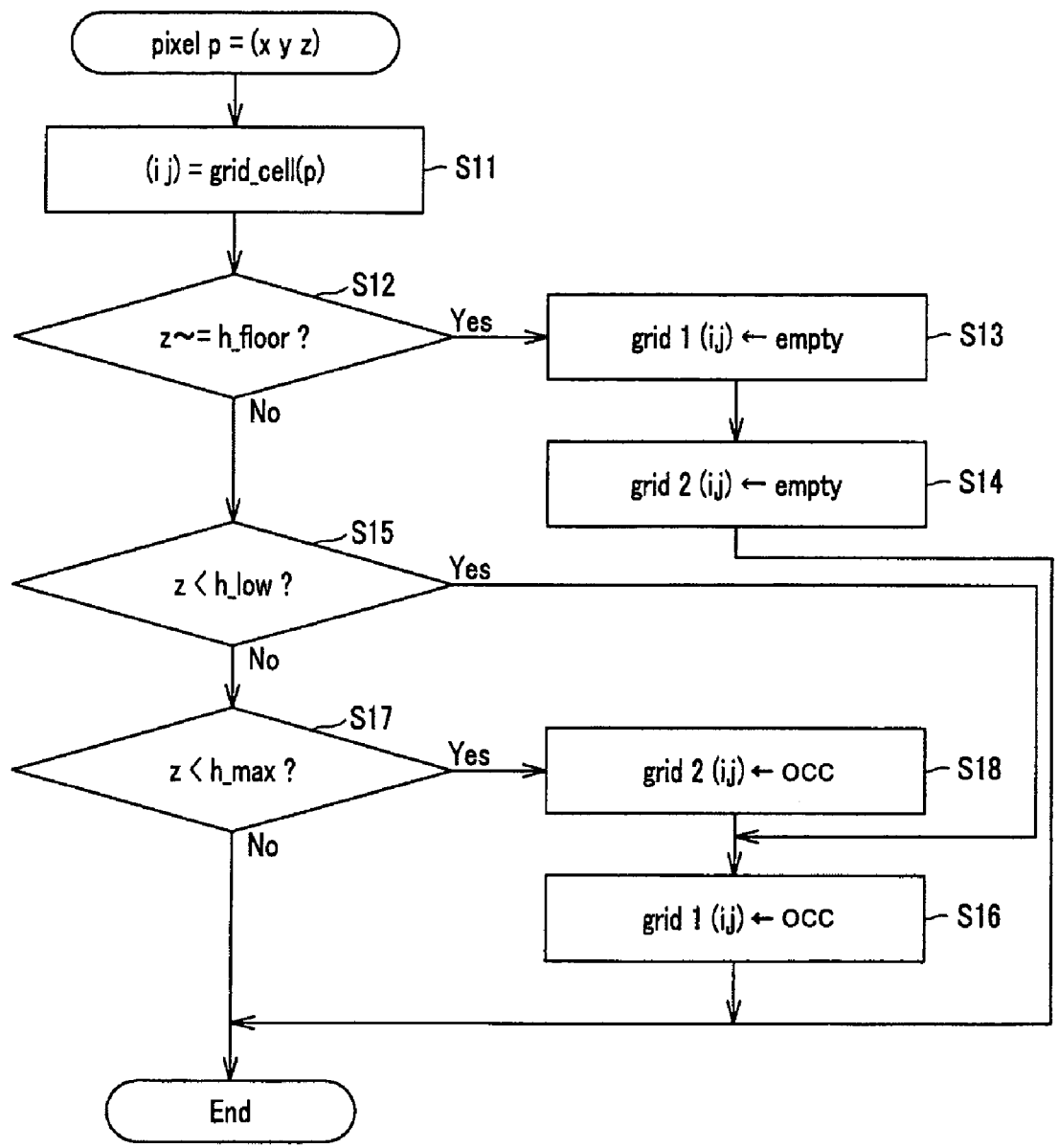
FIG. 9 is a flowchart of the process for updating an obstacle environment map according to the present invention.

FIG. 9 is a flowchart of the grid updating process of the obstacle environment map updating section 4. The obstacle environment map updating section 4 executes a process as described below on each data point P=(x, y, z) in the three-dimensional position information. Firstly, it determines the cell (i, j) of the grid to which point P having coordinate values of (x, y) belongs (Step S11). Then, it judges if the point P serves as data on and near the floor or not by comparing the height z of the point P and the height (h_floor) of the floor on which the robot apparatus 1 is standing upright (Step S12).

If it is judged that the point P serves as data on and near the floor in Step SP12, the obstacle environment map updating section 4 updates both the cell (i, j) in the grid 1 and the cell (i, j) in the grid 2 to which the point P belong by using value EMPTY that indicates that no obstacle is found there (Step S13 and Step S14) and then ends the process.

If, on the other hand, it is judged that the point P does not serve as data on and near the floor in Step S12, the obstacle environment map updating section 4 proceeds to Step S15, where it compares the height z of the point P and the height $h_{low}$ of the bottom of the layer 2.

If it is found in Step S15 that the height z of the point P is lower than $h_{low}$, the obstacle environment map updating section 4 updates the cell (i, j) in the grid 1 by using value OCC that indicates that an obstacle is found there (Step S16). Finally, if it is found that the height z of the point P is not close to the floor but lower than the height $h_{low}$, of the bottom of the layer 2, the point P serves as data found between the height of the floor and $h_{low}$ or lower than the floor. Thus, the grid 1 can show a hole (z<h_floor) cut down from the floor surface as obstacle.

If it is found in Step S15 that the height z of the point P is not lower than $h_{low}$, the obstacle environment map updating section 4 compares it with the height $h_{max}$ of the top of the layer 1 and that of the layer 2 (Step S17).

If it is found in Step S17 that the height z of the point P is lower than $h_{max}$, the obstacle environment map updating section 4 updates both the cell (i, j) in the grid 1 and the cell (i, j) in the grid 2 by using value OCC that indicates that an obstacle is found there (Step S16 and Step S18) and then ends the process.

If, on the other hand, it is found in Step S17 that the height z of the point P is higher than $h_{max}$, the obstacle environment map updating section 4 simply ends the process.

Thus, the obstacle observed by the robot apparatus 1 in the environment can be expressed by the grids of the two different layers by means of the above-described process. The grids are expressed by the existence probability of an obstacle p(c) for each cell. When each cell is updated, it is not updated by overwriting but statistically so that it is possible to draw an obstacle environment map that is robust to noises such as recognition errors.

Figure 10B:
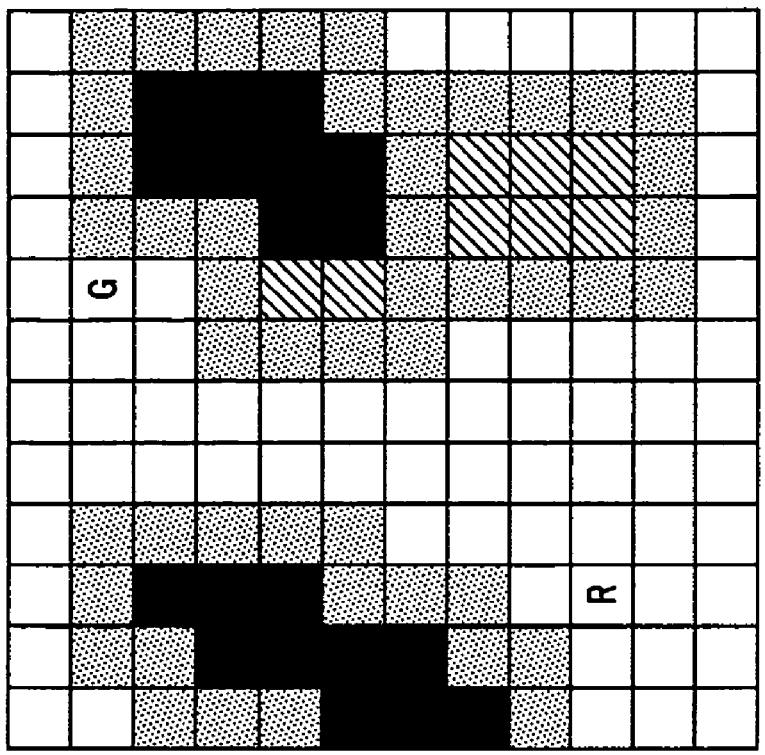
FIGS. 10A and 10B are schematic illustrations of environment maps for an interference check.
Figure 10A:
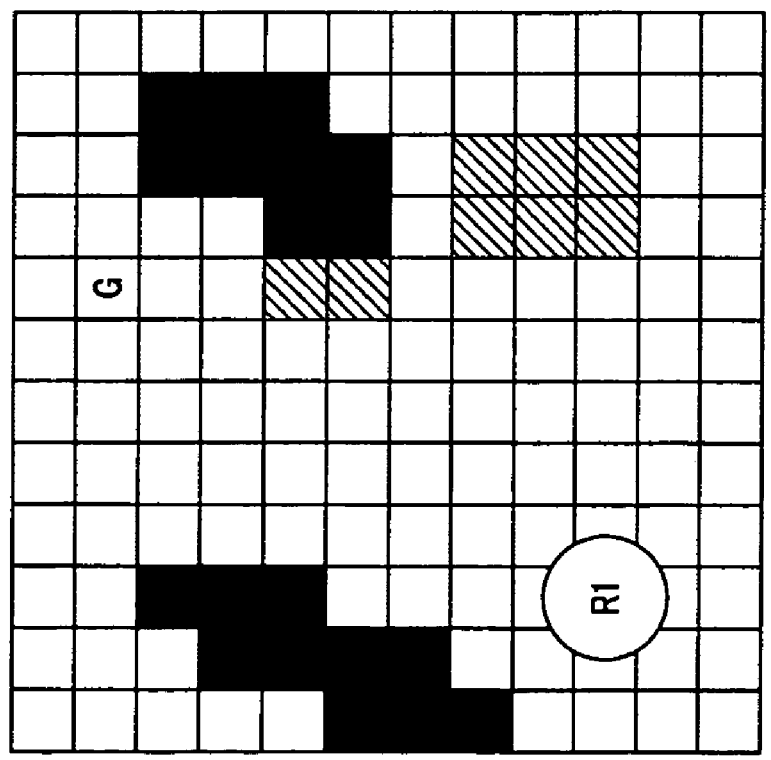
Figure 11B:
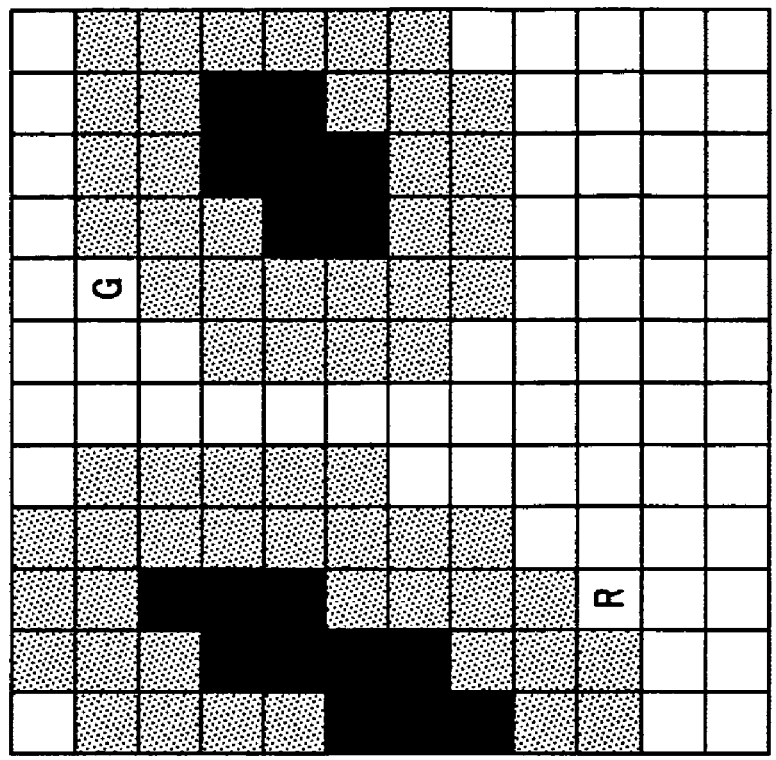
FIGS. 11A and 11B are schematic illustrations of environment maps for an interference check.
Figure 11A:
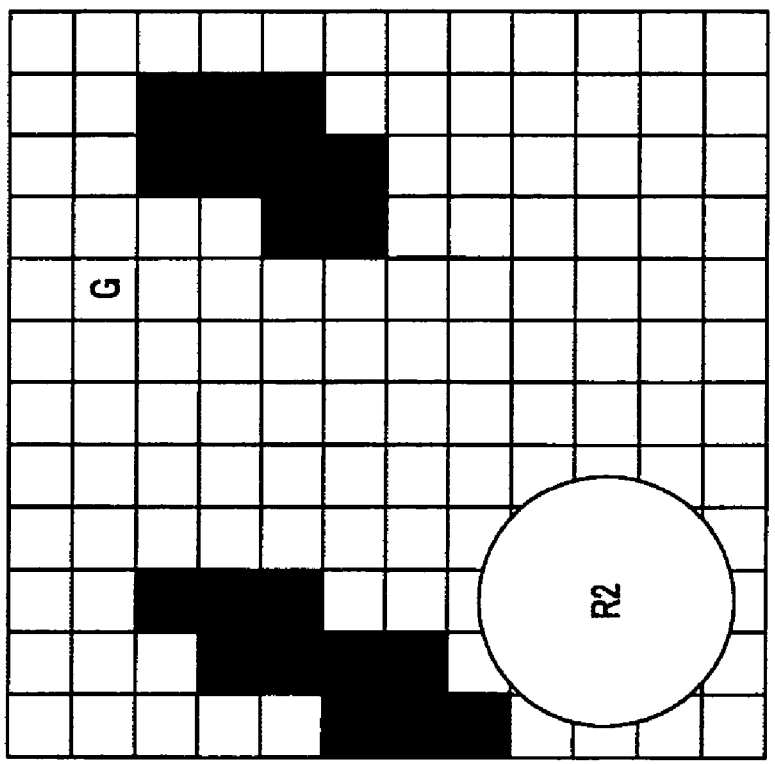

Now, the interference check for the grid 1 and the grid 2 that are updated by the above-described process will be described below. FIGS. 10A and 10B are schematic illustrations of the environment maps of the grid 1 of the layer 1, whereas FIGS. 11A and 11B are schematic illustrations of the environment maps of the grid 2 of the layer 2. In theses drawings, a black cell indicates an area that is occupied by an obstacle and a white cell indicates a free area where the robot apparatus 1 can freely move, whereas a grey cell indicates an area where an obstacle is enlarged by the half diameter of the cylinder that is formed as model as will be described in greater detail hereinafter.

It will be understood by comparing the grid 1 of FIG. 10A and the grid 2 of FIG. 11A, the grid 1 and the grid 2 are different from each other. More specifically, as pointed out above, the grid 1 contains information on the obstacles found between level 0 and level $h_{max}$, whereas the grid 2 contains information on the obstacles found between level $h_{low}$ and $h_{max}$. In other words, the shaded cells in the grid 1 of FIG. 10A indicate the obstacles found between level 0 and level $h_{low}$.

As each cell that indicates an obstacle is enlarged by the half diameter of the circle R1 of the cylinder formed as model in the grid 1 of FIG. 10A, the robot apparatus 1 is converged to point R and the grey cells that are enlarged by the half diameter of the cylinder are recognized as those that indicate obstacles as shown in FIG. 10B.

Similarly, as each cell indicates an obstacle is enlarged by the half diameter of the circle R2 of the cylinder formed as model in the grid 2 of FIG. 11A, the robot apparatus 1 is converged to point R and the grey cells that are enlarged by the half diameter of the cylinder are recognized as those that indicate obstacles as shown in FIG. 11B.

Figure 1B:
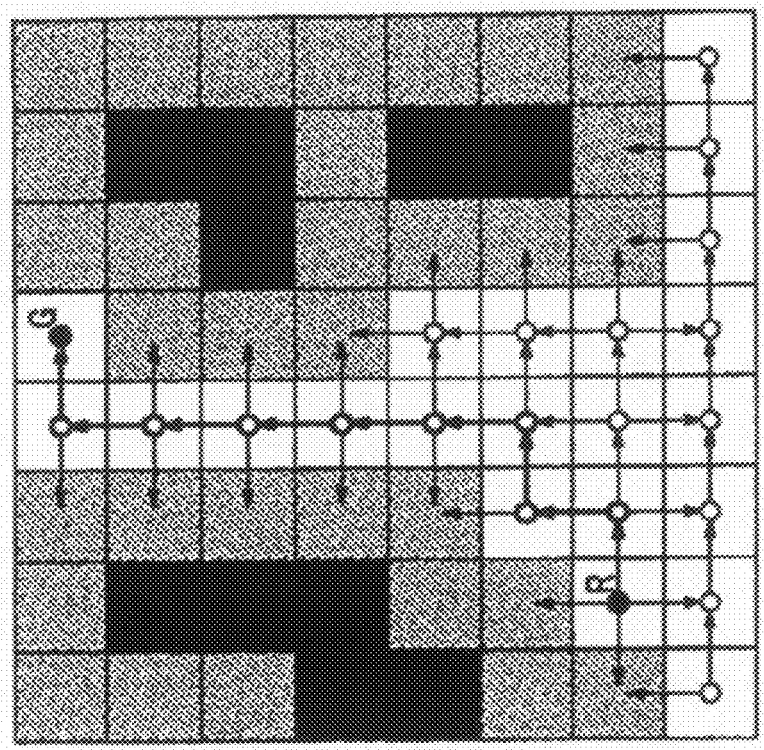
FIGS. 1A and 1B are schematic illustrations of environment maps for using interference check.
Figure 1A:
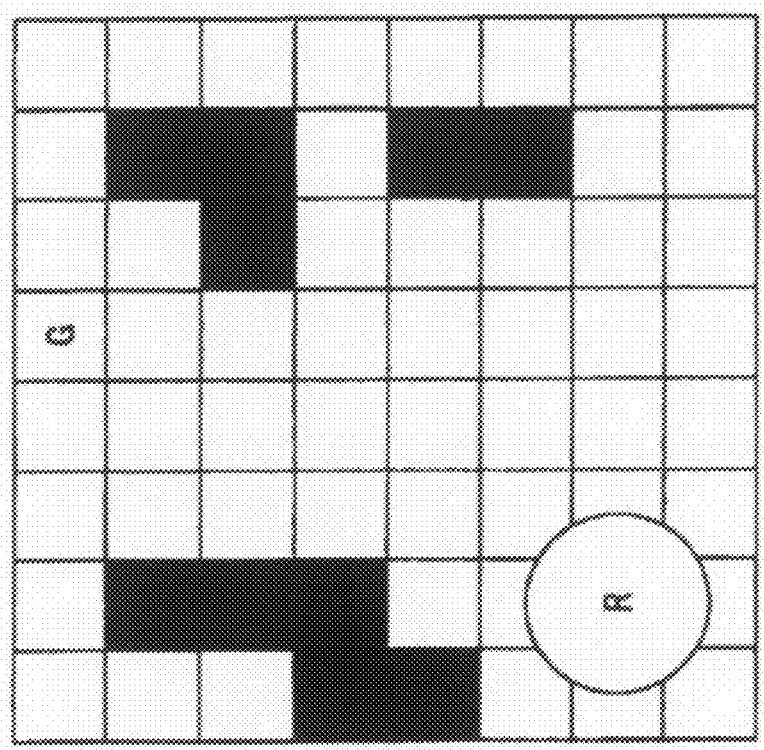
Figure 2:
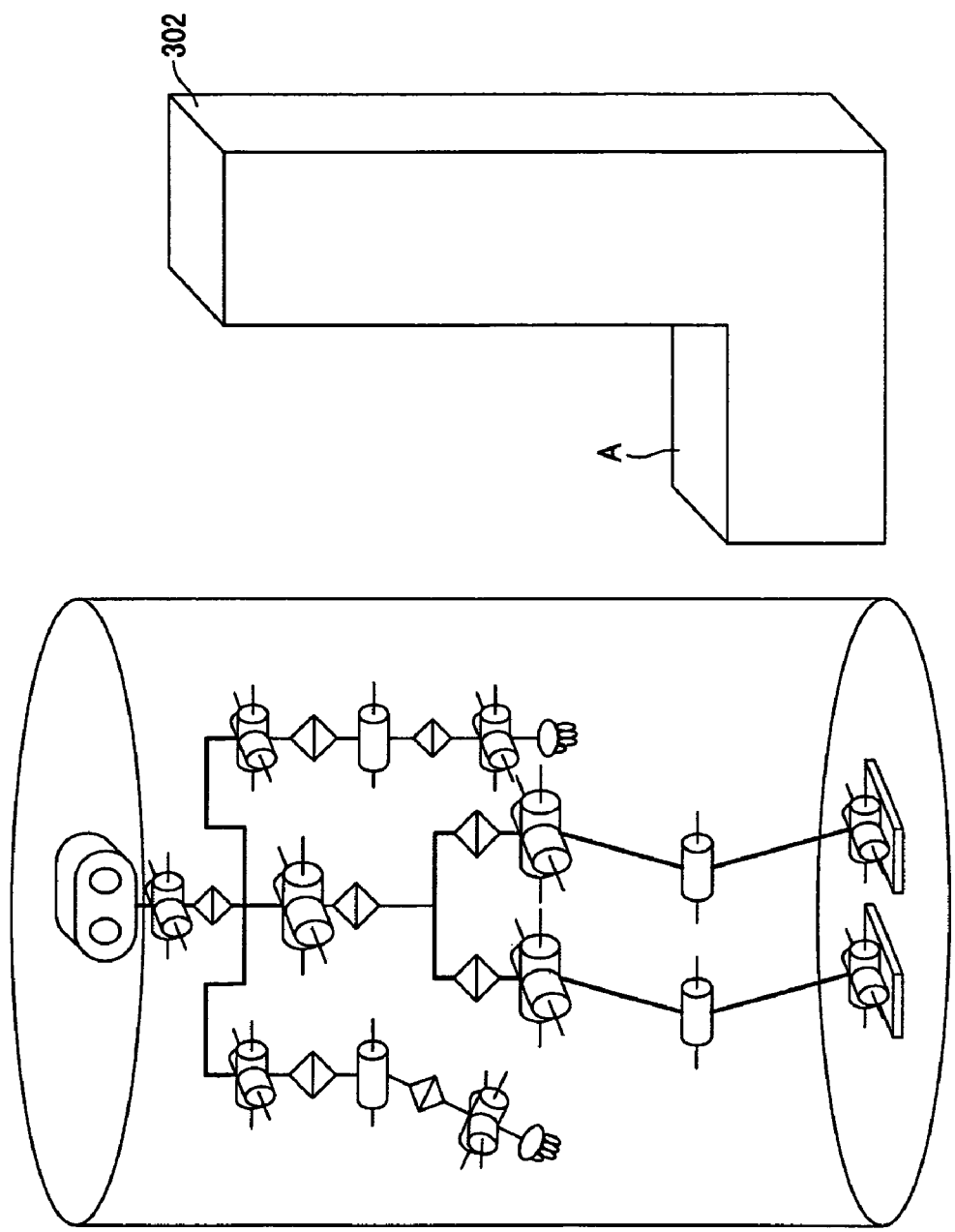
FIG. 2 is a schematic illustration of interference check using a single cylindrical model.
Figure 3B:
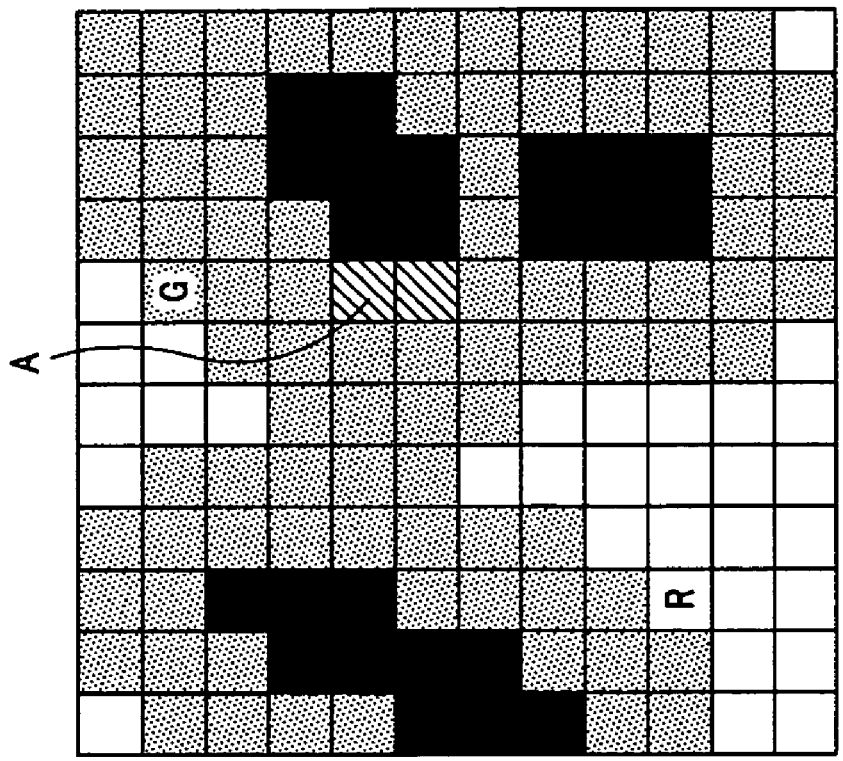
FIGS. 3A and 3B are schematic illustrations of environment maps formed by using interference check using a single cylindrical model.
Figure 3A:
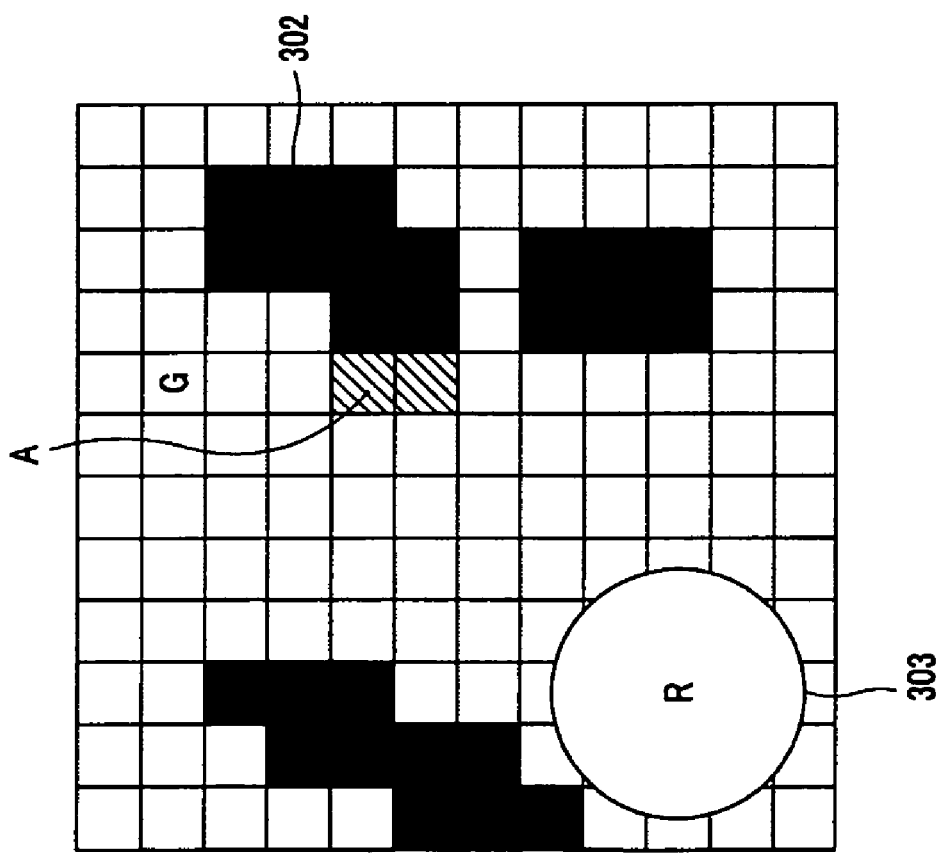
Figure 12:
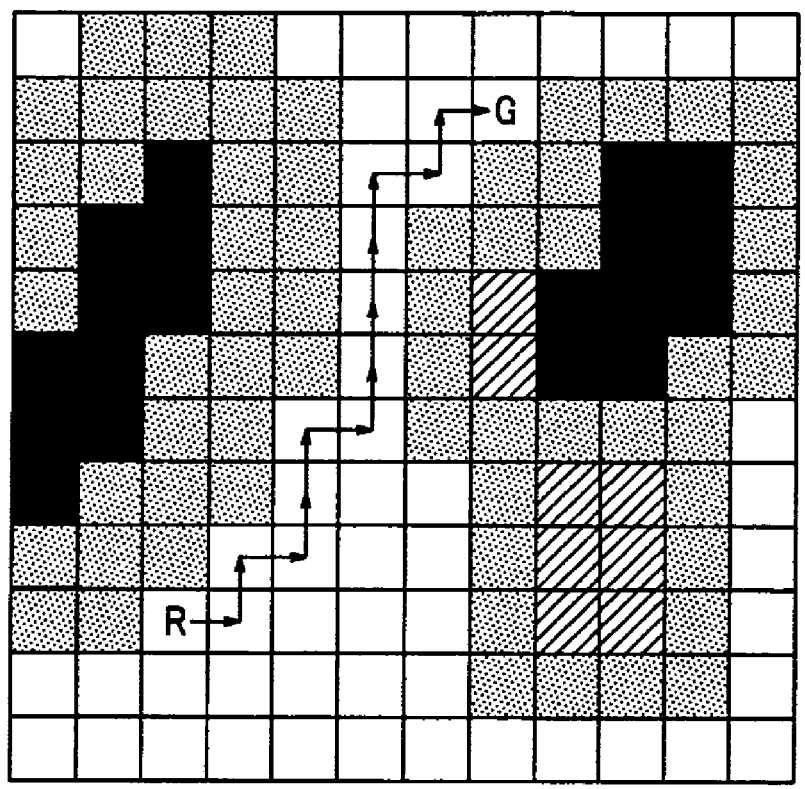
FIG. 12 is a schematic illustration of a map formed by synthetically combining environment maps showing enlarged obstacle regions.

Then, it is possible to obtain an environment map as shown in FIG. 12 by synthetically combining the grid of FIG. 10B and that of FIG. 11B. It will be understood by comparing the environment map of FIG. 12 with the obstacle environment map drawn by using a conventional single cylinder model as shown in FIG. 3B, the area that is recognized as obstacle in the obstacle environment map of FIG. 3B to make it impossible to plan a route from the current position R of the robot apparatus 1 to the goal G is not recognized as obstacle in FIG. 12. Therefore, it is now possible to plan a route from the current position R to the goal G by means of the environment map of FIG. 12.

A route plan is made by the route planning section 7 on the basis of the environment as shown in FIG. 12. A technique called A* search that minimizes the cost of moving along the entire route is employed for the route plan. More specifically, the route is searched out by sequentially connecting the cells that minimizes the evaluated value (cost) of evaluation function f as expressed by formula (3) below, starting from the start cell.

[formula 3] (3)

$$f(n) = \sum_{i=start}^{n} g(i) + \alpha \cdot h(n, goal)$$

In the formula 3 above, g(n) represents the cost at the current node and h(n, goal) represents the estimated cost from the current node to the goal, while α is a weighting coefficient.

Thus, by modeling the robot apparatus 1 by means of two cylinders and preparing grids for the layers that correspond to the respective ranges of height of the cylinders, it is possible to perform an interference check for each of the cylinders having different heights and different diameters. Then, as a result, the interference check can be made highly precise to increase the areas where the robot apparatus 1 can move.

Figure 13:
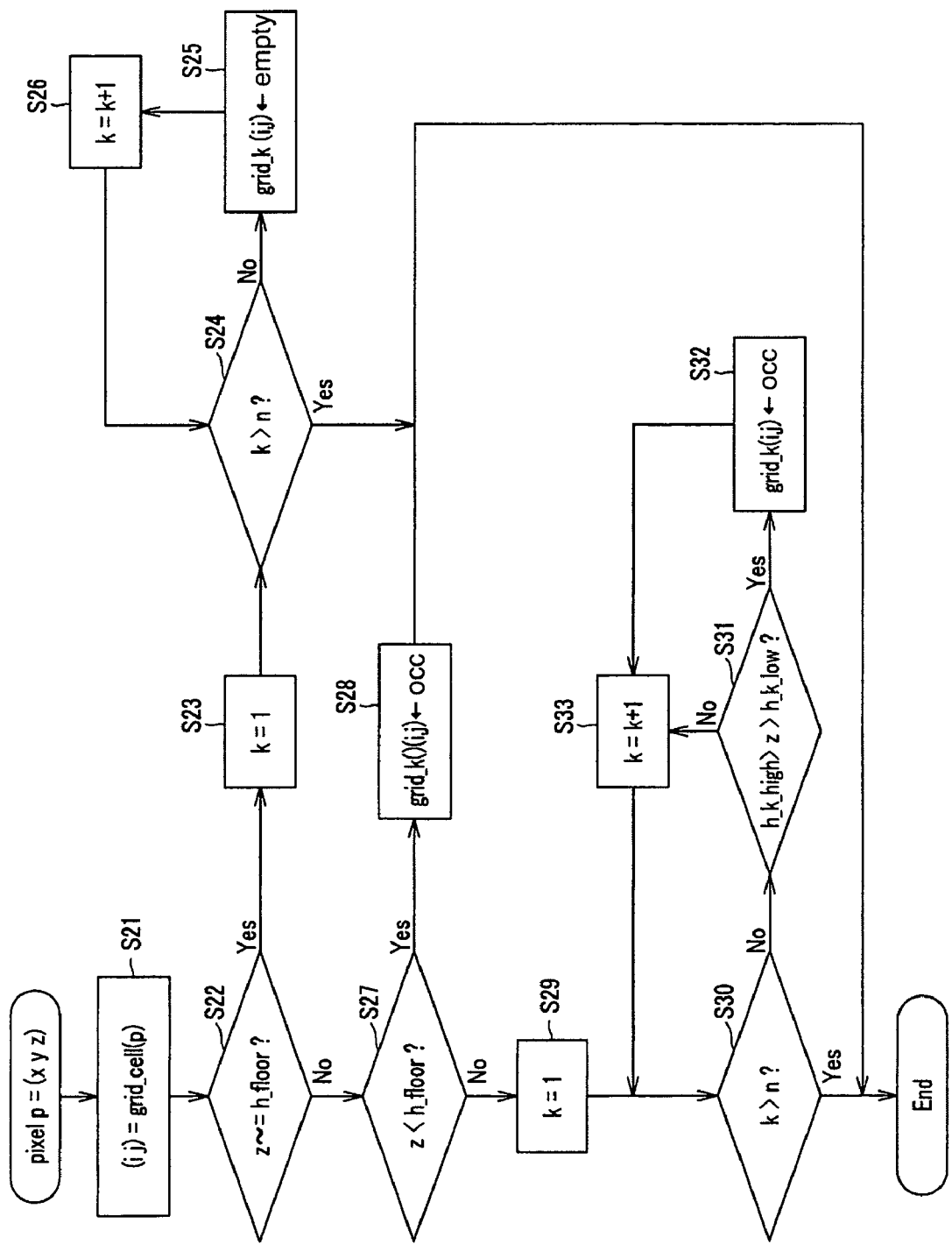
FIG. 13 is a flowchart of a process of updating an obstacle environment map.

While the robot apparatus 1 is modeled by means of two cylinders in the above-described embodiment, the present invention is by no means limited thereto. In other words, a robot apparatus can be modeled by means of more than two cylinders. When a robot apparatus is modeled by means of more than two cylinders, the environment space is divided into more than two layers and more than two grids are generated. The process of updating such a plurality of grids by the obstacle environment map updating section 4 will be described below by referring to the flowchart of FIG. 13. In this instance, a robot apparatus 1 is modeled by means of n cylinders (k=1, 2, ..., n) and hence n grids (k=1, 2, ..., n) are generated. Information on areas below the floor surface where the robot apparatus 1 is standing upright is expressed by grid 0.

The obstacle environment map updating section 4 executes the process as described below on each data point P=(x, y, z) in the three-dimensional position information. Firstly, it determines the cell (i, j) in the obstacle environment grid to which the point P belongs from the (x, y) coordinates of the point P (Step S21). Then, it judges if the point P serves as data on and near the floor or not by comparing the height z of the point P with the level of the floor (h_floor) on which the robot apparatus 1 is standing upright (Step S22).

If it is determined that the point P serves as data on and near the floor in Step S22, the obstacle environment map updating section 4 updates the cells (i, j) of all the grids k (k=1, 2, ..., n) by using value EMPTY that indicates that no obstacle is found there (Step S23 and Step S26). More specifically, it sequentially substitutes k, starting from k=1 (Step S23) and, if it is found in Step S24 that k is smaller than n, it updates the cell by using EMPTY (Step S23) and increments k by one (Step S26). Then, it returns to Step S24, where it compares the value of k with that of n. If it is found in Step S24 that k is not smaller than n, the obstacle environment map updating section 24 ends the updating process.

If it is determined in Step S22 that the point P does not serve as data on and near the floor, the obstacle environment map updating section 4 determines if the point P serves as data on a position lower than the floor surface or not (Step S27).

If it is determined in Step S27 that the height z of the point P is lower than the floor surface, the obstacle environment map updating section 4 updates the cell (i, j) of the grid 0 by using value OCC that indicates that there is an obstacle in the cell (Step S28) and ends the process.

If it is determined in Step S27 that the height z of the point P is not lower than the floor surface, the obstacle environment map updating section 4 updates the cells (i, j) of the grids k (k=1, 2, ..., n) by using OCC (Steps S29 through S33). More specifically, the obstacle environment map updating section 4 sequentially substitutes k, starting from k=1 (Step S29) and, if it is found in Step S30 that k is not larger than n, it proceeds to Step S31, where it determines if the height z of the point P is found within the range of height of the layer of the grid k, or h_k_high>z>h_k_low or not (Step S31). If it is found in Step S30 that the height z of the point P is found within the range of height of the layer of the grid k, or h_k_high>z>h_k_low, the obstacle environment map updating section 4 updates the cell (i, j) of the grid k by using OCC (Step S32). The obstacle environment map updating section 4 then increments k and returns to Step S30.

If it is found in Step S31 that the height z of the point P is not found within the range of height of the layer of the grid k, or h_k_high>z>h_k_low, the obstacle environment map updating section 4 increments k and returns Step S30.

If, on the other hand, it is found in Step S30 that k is larger than n, the obstacle environment map updating section 4 ends the updating process. In this way, it is possible for the robot apparatus 1 to adapt itself to a complex environment by executing an updating process for the grids obtained by dividing the environment into a plurality of layers.

Figure 14:
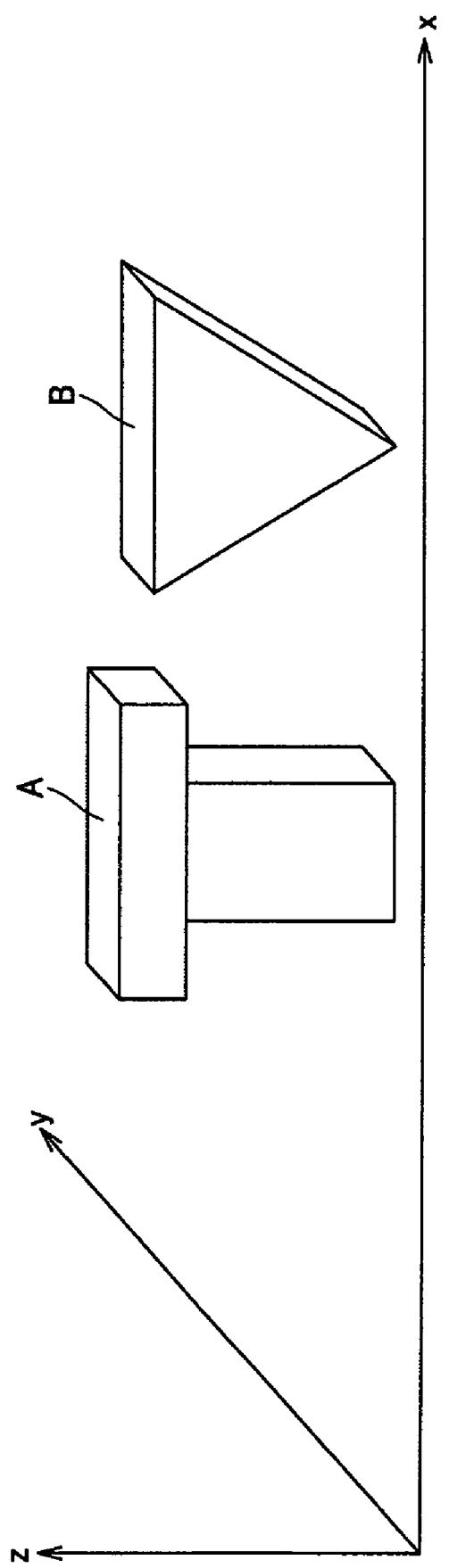
FIG. 14 is a schematic illustration of obstacles.
Figure 15:
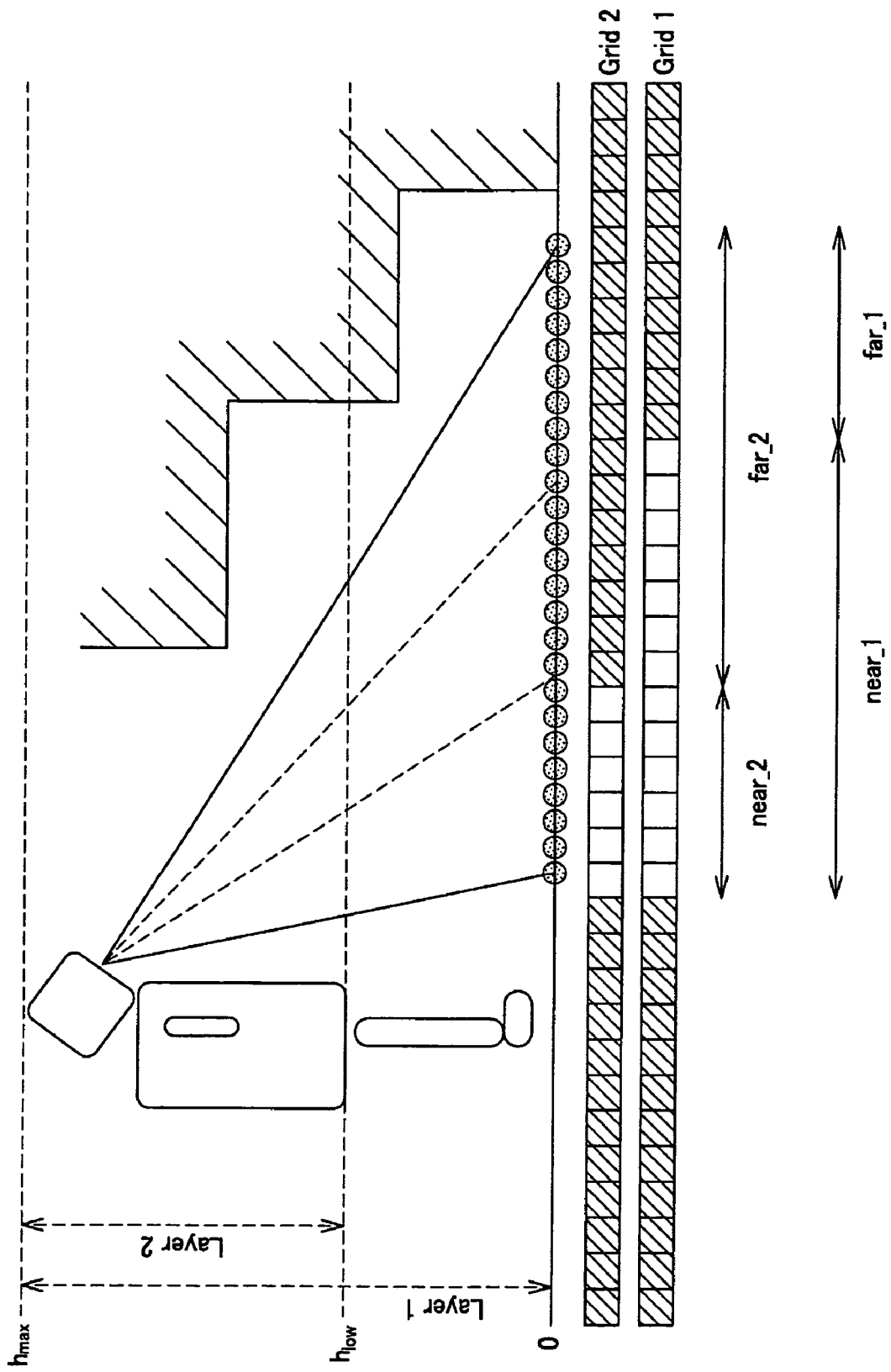
FIG. 15 is a schematic illustration of layers that correspond to cylinders.

Problems can arise with the above-described updating process because the robot apparatus 1 executes an EMPTY process for all the grid cells of all the layers when it observes the floor. For example, if an obstacle A having an upper part larger than a lower part and a triangular obstacle B turned upside down so as to make the apex contact the floor surface as shown in FIG. 14 and the robot apparatus 1 observes the floor as shown in FIG. 15, it executes an EMPTY process for all the grid cells of all the layers in the above-described updating process. Then, if the robot apparatus 1 recognized an upper part of each of the obstacles in the preceding observation, the obstacles may be erased from the obstacle environment map as a result that the robot apparatus 1 observes the floor and executes an EMPTY process as seen from FIG. 15.

For this reason, in this embodiment, a near region and a far region are defined for each layer as a function of the distance from the robot apparatus 1 and no EMPTY process is executed for the floor in far region so that an EMPTY process is executed for the floor only in the near region. The distance selected from the near region and the far region is defined independently for each layer. For example, a near region near_1 and a far region far_1 are defined for the layer 1 and a near region near_2 and a far region far_2 are defined for the layer 2 in such a way that the near region near_1 of the layer 1 that includes the floor is made larger than the near region near_2 of the layer 2. With this arrangement, it is possible to avoid an EMPTY process for an obstacle having an upper part larger than a lower part thereof that cannot be picked up by the CCD cameras 10R, 10L when shooting the layers.

Figure 16:
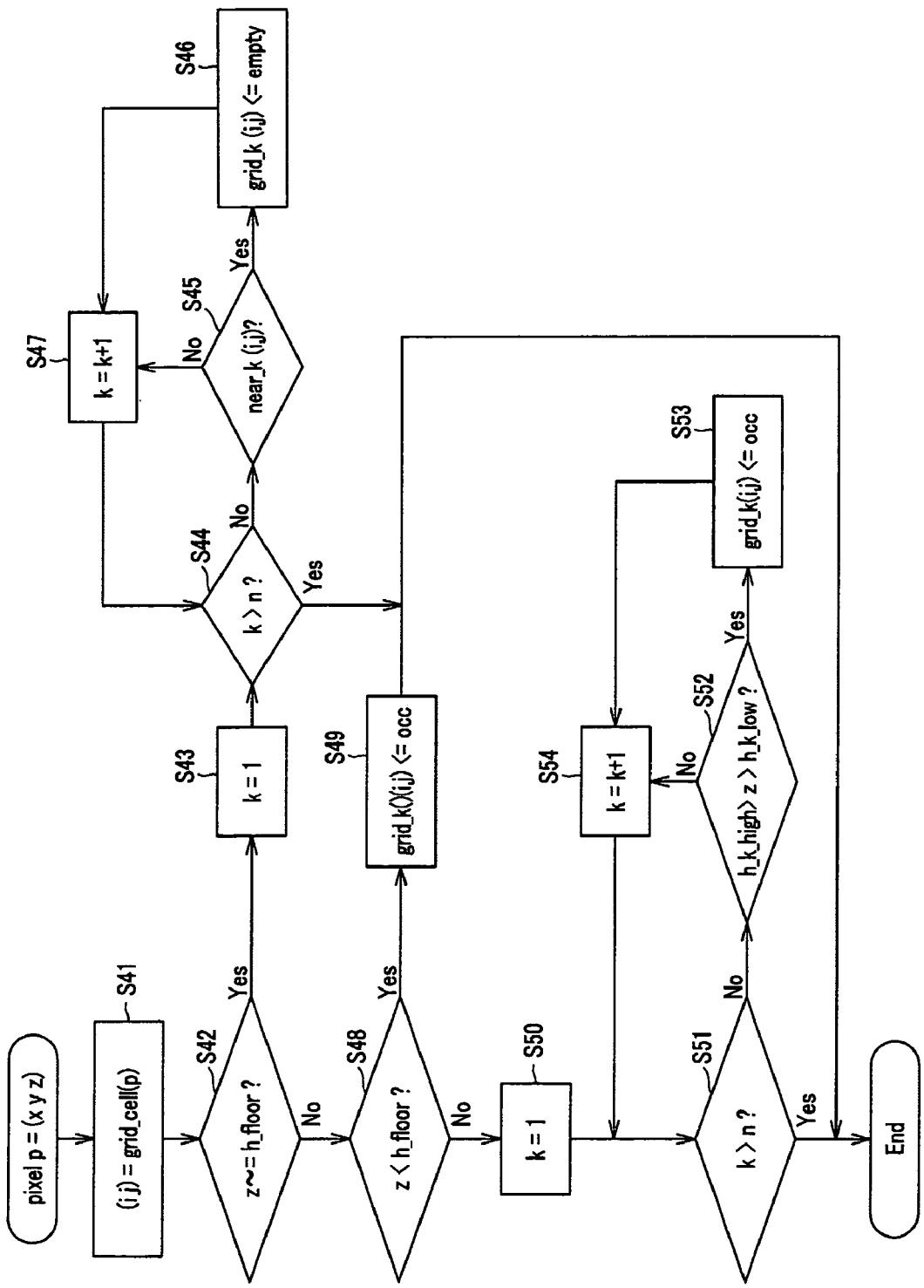
FIG. 16 is a flowchart of a process of updating an obstacle environment map.

The process of the obstacle environment map updating section 4 when a near region and a far region are defined for each layer as a function of the distance from the robot apparatus 1 will be described by referring to the flowchart of FIG. 16. In this instance, the robot apparatus 1 is modeled by using n cylinders (k =1, 2, ..., n) and n grids (k=1, 2, ..., n) are formed so as to correspond to the heights of the cylinders. Additionally, the information on the part lower than the floor surface where the robot apparatus 1 is standing upright is expressed by grid 0.

The obstacle environment map updating section 4 executes a process as described below for each data point P=(x, y, z) for three-dimensional position information. Firstly, it determines the cell (i, j) of the obstacle environment grid to which the point P belongs from the coordinates (x, y) of the point P (Step S41). Then, it judges if the point P serves as data for the floor and its vicinity by comparing the height z of the point P and the level (h_floor) of the floor on which the robot apparatus 1 standing upright (Step S42).

If it is determined in Step S42 that the point P serves as data for the floor and its vicinity, the obstacle environment map updating section 4 determines if the point P is located near the robot apparatus 1 or not (Steps S43 through S47) for all the grids k (k=1, 2 ... n). More specifically, it substitutes k from k=1 (Step S43) and, if it is found in Step S44 that k is not larger than n, it judges if the point P is located in a near region (near_k) on the grid k or not (Step S45).

If it is judged in Step S45 that the point P is located in a near region on the grid k, the obstacle environment map updating section 4 executes an EMPTY process on the cell k (i, j) of the grid k (Step S46). If, on the other hand, it is judged in Step S45 that the point P is not located in a near region on the grid k, the obstacle environment map updating section 4 increments k (Step S47) and returns to Step S44.

If it is determined in Step S44 that k is not smaller than n, the obstacle environment map updating section 4 ends the updating process.

Returning to Step S42, if it is determined that the point P does not serve as data for the floor and its vicinity, the obstacle environment map updating section 4 determines if the point P is a data point for a position lower than the floor surface or not (Step S48).

If it is determined in Step S48 that the level of the point P is lower than the floor surface, the obstacle environment map updating section 4 updates the cell (i, j) of the grid 0 by means of the value OCC that indicates an obstacle (Step S49) and ends the process.

If, on the other hand, it is determined in Step S48 that the level of the point P is not lower than the floor surface, the obstacle environment map updating section 4 updates the cell (i, j) of the grid k (k=1, 2, . . . , n) of the layers including the layer of the height z (Steps S50 through S54). More specifically, the obstacle environment map updating section 4 sequentially substitutes k, starting from k=1 (Step S50) and, if it is found in Step S51 that k is not larger than n, it proceeds to Step S52, where it judges if the height z of the point P is found within the range $h\_k\_high > z > h\_k\_low$ or not (Step S52). If it is determined that the height z of the point P is found within the range $h\_k\_high > z > h\_k\_low$, the obstacle environment map updating section 4 updates the cell (i, j) of the grid k by means of OCC (Step S53). Then, it increments k (Step S54) and returns to Step S52.

If, on the other hand, it is determined in Step S52 that the height z of the point P is not found within the range $h\_k\_high > z > h\_k\_low$, the obstacle environment map updating section 4 increments k and returns to Step S51.

If it is found that k is larger than n in Step S51, the obstacle environment map updating section 4 ends the updating process.

Thus, it is possible to avoid colliding with an obstacle having an upper part larger than a lower part as shown in FIG. 14 by defining a near region and a far region as a function of the distance from the robot apparatus 1 and executing an EMPTY process only for the floor of the far region, without executing such an EMPTY process for the floor of the near region.

Figure 17A:
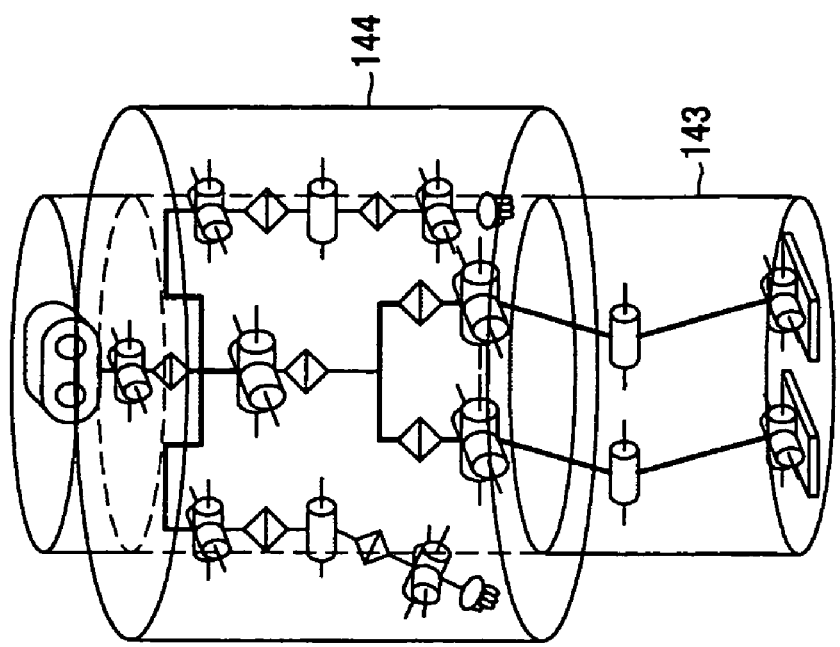
FIGS. 17A and 17B are schematic illustrations of a model formed by using two cylinders.
Figure 17B:
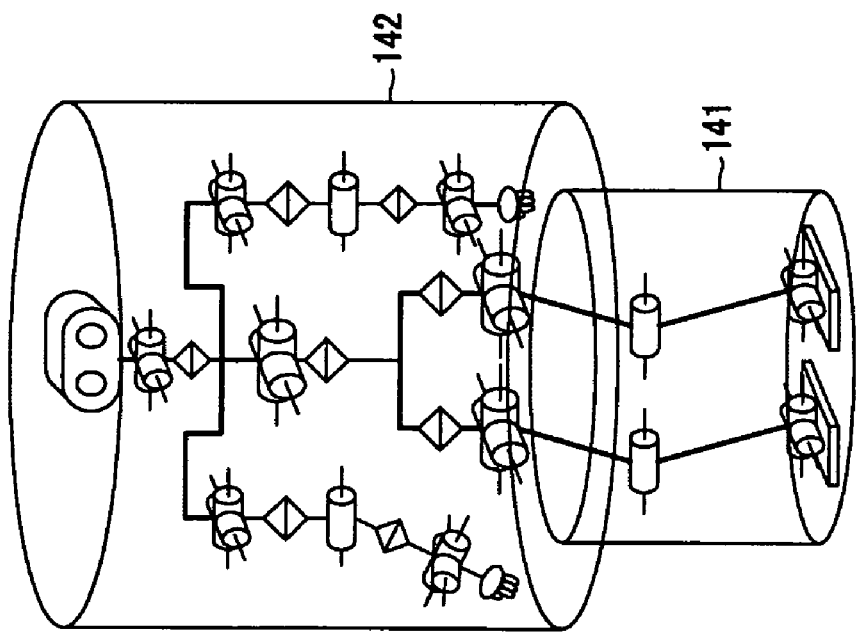

The robot apparatus 1 can be modeled in various different ways. For example, it may be modeled by means of two cylinders as shown in FIG. 17A, where the legs are modeled by means of a cylinder 141 and the head section and the trunk section are modeled by means of another cylinder 142. Alternatively, the head section through the leg sections may be modeled by means of a cylinder 143 and the trunk section may be modeled by means of another cylinder 144 as shown in FIG. 17B.

Figure 18C:
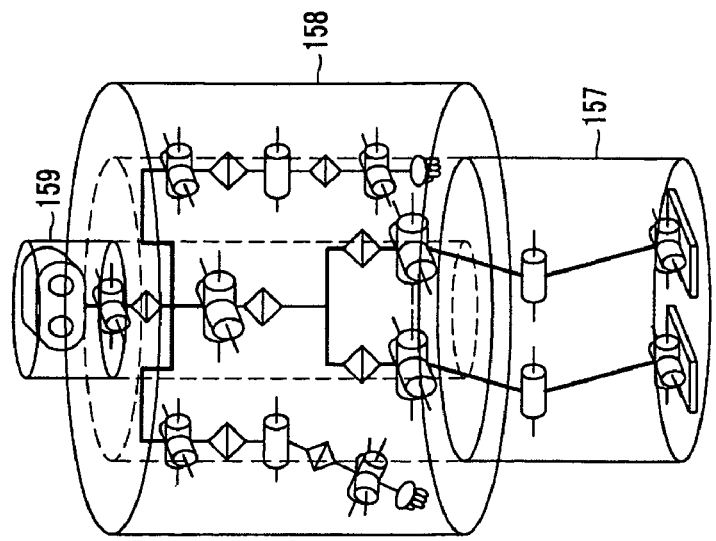
FIGS. 18A through 18C are schematic illustrations of a model formed by using three cylinders.
Figure 18B:
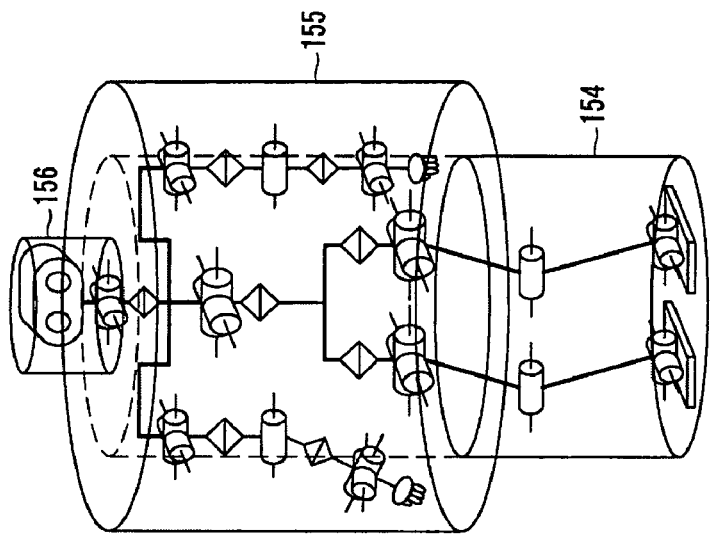
Figure 18A:
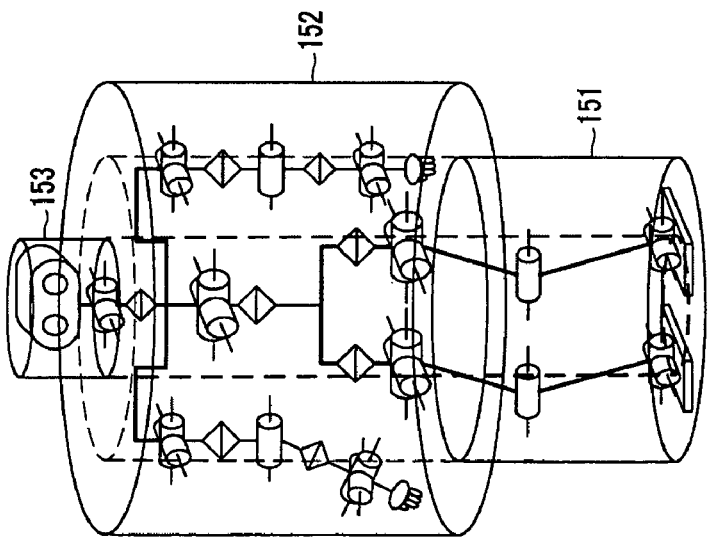
Figure 19C:
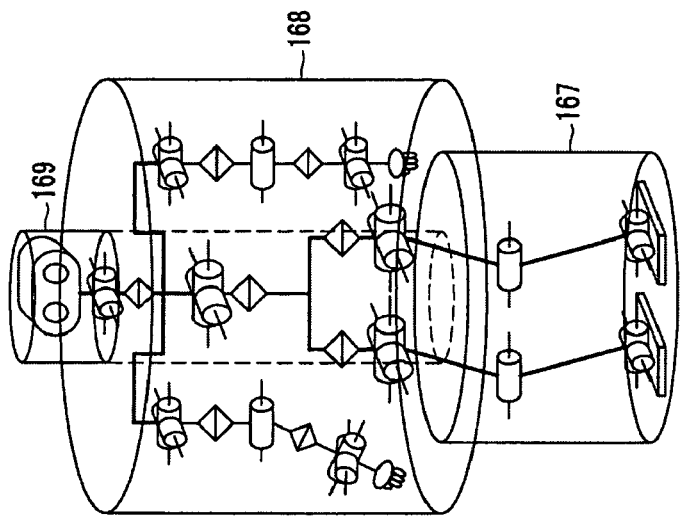
FIGS. 19A through 19C are schematic illustrations of a model formed by using three cylinders.
Figure 19B:
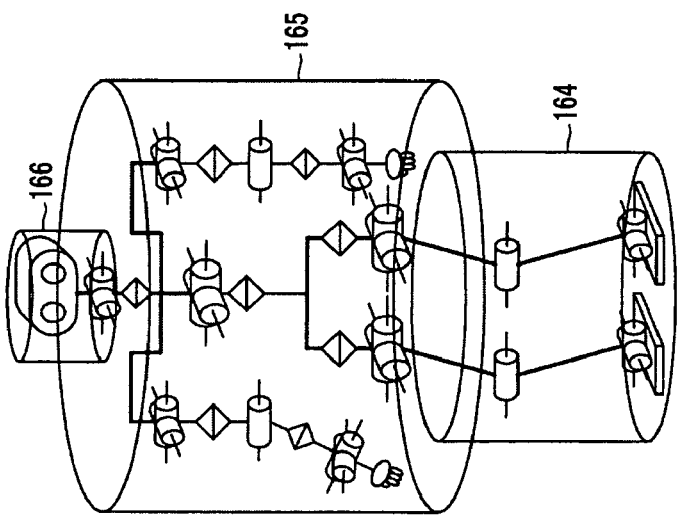
Figure 19A:
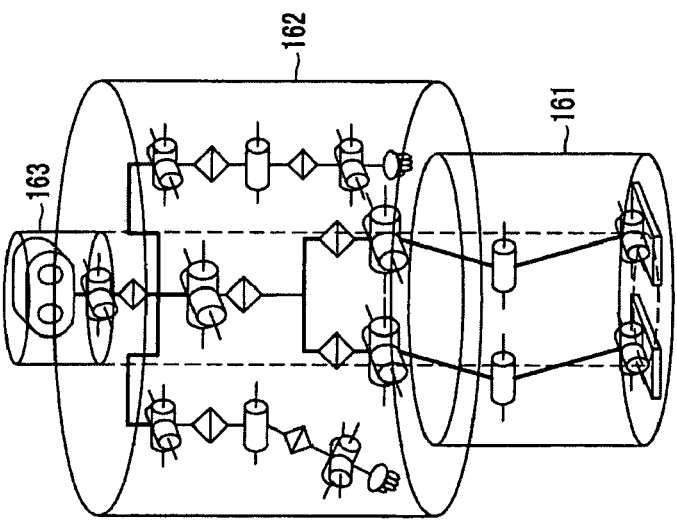

Still alternatively, the robot apparatus 1 may be modeled by means of three cylinders as shown in FIGS. 18A through 19C, which illustrate so many instances. In the instance of FIG. 18A, the trunk section through the leg sections are modeled by means of a cylinder 151 and the trunk section is modeled by means of another cylinder 152, while the head section through the leg sections are modeled by means of still another cylinder 153. In the instance of FIG. 18B, the trunk section through the leg sections are modeled by means of cylinder 154, while the trunk section and the head sections are modeled respectively by cylinders 155 and 156. In the instance of FIG. 18C, the trunk section through the leg sections are modeled by means of a cylinder 157 and the trunk section 158 is modeled by means another cylinder 158, while the head section through the trunk section are modeled by means of still another cylinder 159. In the instance of FIG. 19A, the leg sections are modeled by means of a cylinder 161 and the trunk section is modeled by means of another cylinder 162, while the head section through the leg sections are modeled by means of still another cylinder 163. In the instance of FIG. 19B, the leg sections are modeled by means of a cylinder 164, while the trunk section and the head section are modeled respectively by means of cylinders 165 and 166. Finally, in the instance of FIG. 19C, the leg sections are modeled by means of a cylinder 167 and the trunk section is modeled by means of another cylinder 168, while the head section through the trunk section are modeled by means of still another cylinder 169.

It is possible to make the robot apparatus 1 adapt itself to a complex external environment because various grids are formed to show various pieces of information on obstacles by modeling the robot apparatus 1 by means of a plurality of cylinders that have horizontal respective bottoms and share a common center axis.

Figure 20:
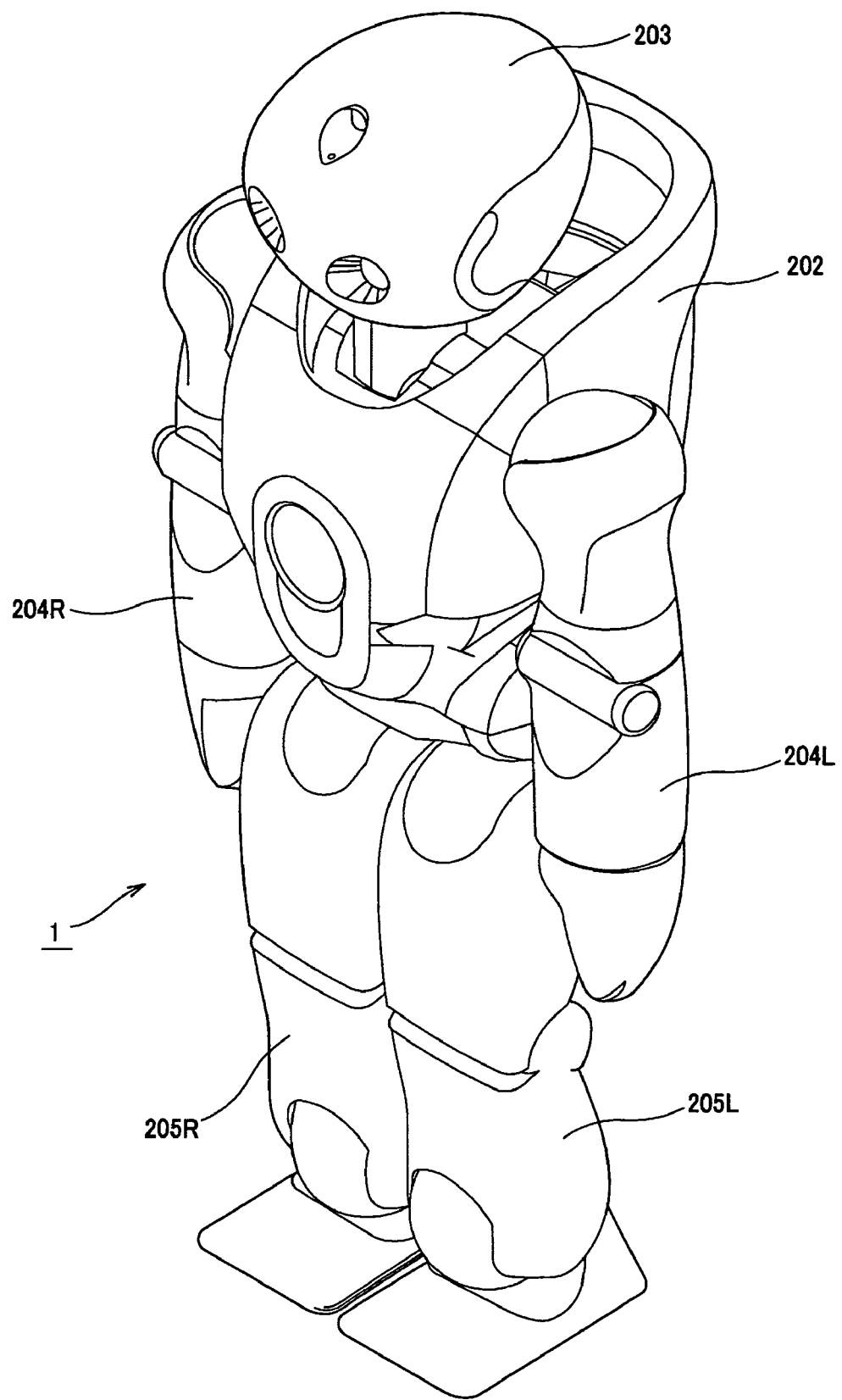
FIG. 20 is a schematic perspective view of an embodiment of robot apparatus according to the invention, showing the appearance thereof.

Now, the robot apparatus 1 on which the obstacle avoiding apparatus 2 is mounted will be described in greater detail by referring to FIGS. 20 through 22. FIG. 20 is a schematic perspective view of the robot apparatus 1 of FIG. 4. As shown in FIG. 20, the robot apparatus 1 has a head unit 203 that is linked to a trunk unit 202 at a predetermined position and two arm units 204R/L including a left arm unit and a right arm unit, and two leg units 205R/L including a left leg unit and a right leg unit, that are linked to the trunk unit 202 at predetermined respective positions.

Figure 21:
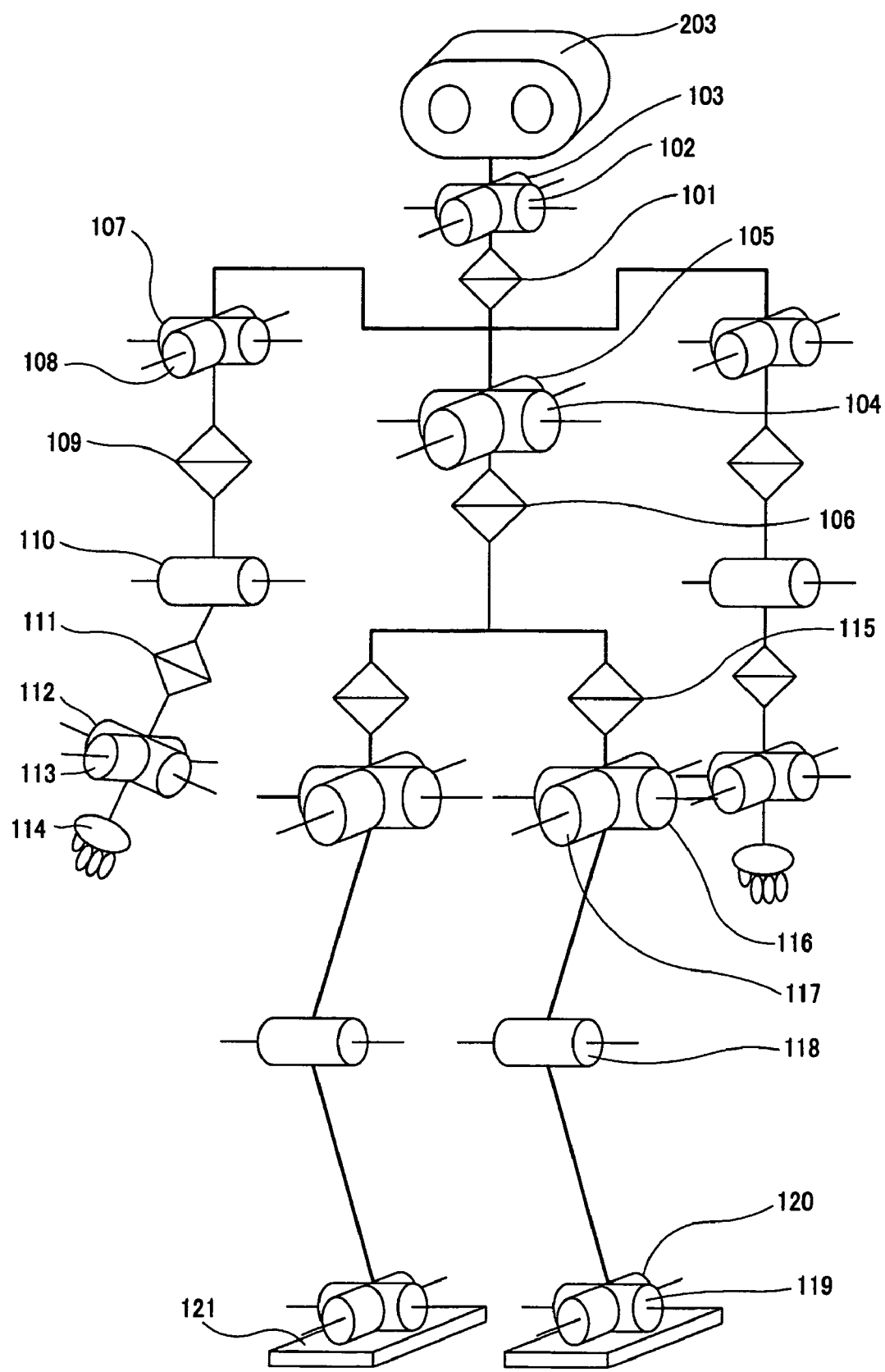
FIG. 21 is a schematic illustration of the degrees of freedom of the joints of the robot apparatus of FIG. 20.

FIG. 21 schematically illustrates the degree of freedom of each of the joints of the robot apparatus 1. The neck joint that supports the head unit 203 has three degrees of freedom realized by a neck joint yaw axis 101, a neck joint pitch axis 102 and a neck joint roll axis 103.

Each of the arm units 204R/L of the upper limbs includes a shoulder joint pitch axis 107, a shoulder joint roll axis 108, an upper arm yaw axis 109, an elbow joint pitch axis 110, a forearm yaw axis 111, a wrist joint pitch axis 112, a wrist joint roll axis 113 and a hand section 114. The hand sections 114 are in reality multi-joint structures having a multi-degree of freedom. However, since the behavior of each of the hand sections 114 neither contributes to nor affects significantly the attitude control and the walk control of the robot apparatus 1 and hence it is assumed to have zero degrees of freedom for the purpose of the present invention. Therefore, each of the arm units has seven degrees of freedom.

The trunk unit 202 includes a trunk pitch axis 104, a trunk roll axis 105 and a trunk yaw axis 106 and hence has three degrees of freedom.

Each of the leg units 205R/L of the lower limbs includes a hip joint yaw axis 115, a hip joint pitch axis 116, a hip joint roll axis 117, a knee joint pitch axis 118, an ankle joint pitch axis 119, an ankle joint roll axis 120 and a sole 121. For the purpose of the present invention, the intersection of the hip joint pitch axis 116 and the hip joint roll axis 117 is defined as the hip joint position of the robot apparatus 1. The soles 121 of human being are in reality multi-joint structures having a multi-degree of freedom. However, they are defined to have zero degrees of freedom for simplicity for the purpose of the present invention. Therefore, each of the leg units has six degrees of freedom.

Thus, as a whole, the robot apparatus 1 has $3+7\times 2+3+6\times 2=32$ degrees of freedom in total. However, the degrees of freedom of entertainment robot apparatus 1 are not limited to thirty two. It may be needless to say that the degrees of freedom, or the number of joints, of a robot apparatus may be increased or decreased from thirty two depending on the various restrictions for designing and preparing the robot apparatus and the specified requirements of the robot apparatus.

Each of the degrees of freedom of the robot apparatus 1 is realized by an actuator mounted in the robot apparatus 1. The actuators of the robot apparatus 1 is preferably small and lightweight from the viewpoint of eliminating excessive swells from the appearance so as to approximate the natural profile of man and meeting the requirements for controlling the attitude of the biped robot that is an unstable structure.

The robot apparatus 1 is equipped with a control system for controlling the motions of the entire robot apparatus that is typically mounted in the trunk unit 202. FIG. 22 is a schematic illustration of the control system of the robot apparatus 1, showing the configuration thereof. Referring to FIG. 22, the control system includes a thinking control module 200 for controlling emotional judgments and emotional expressions of the robot apparatus in response to user inputs and a motion control module 300 for controlling coordinated motions of the whole body of the robot apparatus 1 including driving the actuators 350.

The thinking control module 200 includes a CPU (central processing unit) 211 for executing various operational processes relating emotional judgments and emotional expressions, a RAM (random access memory) 212, a ROM (read only memory) 213 and an external storage apparatus (hard disk drive or the like) 214. It is an independent drive type module adapted to execute processes in a self-conclusive manner within the module.

The thinking control module 200 determines the current emotion and the current will of the robot apparatus 1 according to the stimuli applied to it externally including the video data input to it by way of a video input apparatus 251 and the audio data input to it by way of an audio input apparatus 252. More specifically, it recognizes the expressions of the user from the image input to it and reflects the information contained in the expressions to the emotion and the will of the robot apparatus 1 so that it can manifest a behavior that corresponds to the expressions of the user. The video input apparatus 251 typically includes a plurality of CCD (charge coupled device) cameras and can obtain a distance image from the images picked up by the cameras. Similarly, the audio input apparatus 252 typically includes a plurality of microphones.

The thinking control module 200 issues commands to the motion control module 300 so as to execute an action sequence or a behavior sequence, which includes motions of the limbs, according to the decision made by the will of the robot apparatus 1.

On the other hand, the motion control module 300 includes a CPU 311 for controlling coordinated motions of the whole body of the robot apparatus 1, a RAM 312, a ROM 313 and an external storage apparatus (hard disk drive or the like) 314. The external storage apparatus 314 can accumulate walk patterns and aimed ZMP trajectories that are computed offline as well as other behavior plans.

Figure 22:
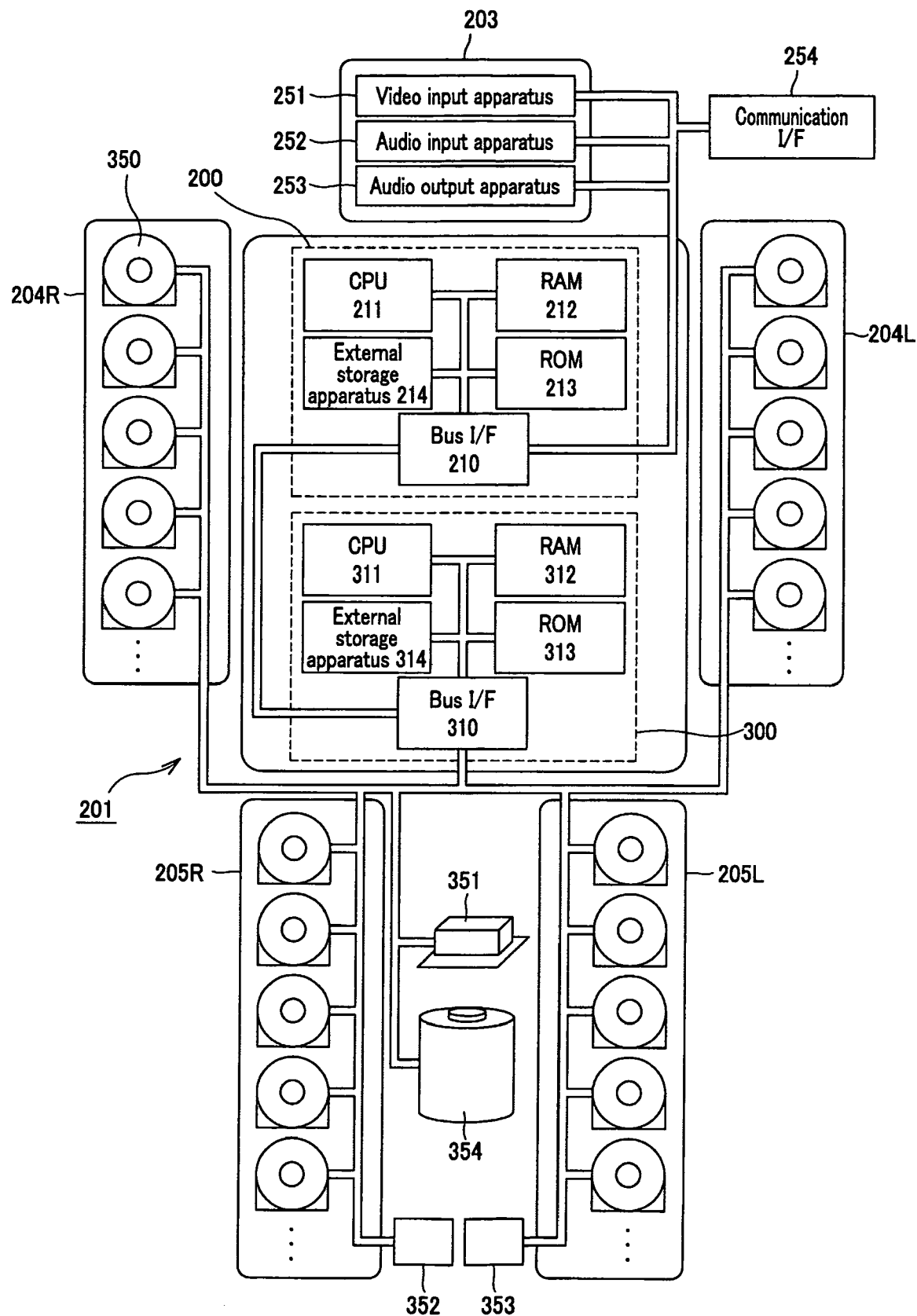
FIG. 22 is a schematic illustration of the control system of the robot apparatus of FIG. 20, showing the configuration thereof.

The motion control module 300 is connected to the actuators 350 distributed to the entire body of the robot apparatus 1 so as to realize the degrees of freedom of the joints thereof as shown in FIG. 22, a distance measuring sensor (not shown) for measuring the distance between an external object and the robot apparatus 1, an attitude sensor 351 for observing the posture and the inclination of the trunk unit 202, ground touch confirmation sensors 352, 353 for detecting the left and right soles leaving or touching the floor, the load sensors arranged on the soles 121, 121, a power source control apparatus 354 for controlling the power source such as battery and so on by way of a bus interface (I/F) 310. The attitude sensor 351 is formed typically by combining an acceleration sensor and a gyro sensor, whereas each of the ground touch confirmation sensors 352, 353 is formed typically by means of a proximity sensor or a micro switch.

The thinking control module 200 and the motion control module 300 are formed on a common platform and connected to each other by way of bus interfaces 210, 310.

The motion control module 300 controls the coordinated motions of the whole body of the robot apparatus 1 by means of the actuators 350 in order to realize the behavior specified by the thinking control module 200. More specifically, the CPU 311 takes out the motion pattern that corresponds to the behavior specified by the thinking control module 200 from the external storage apparatus 314 or internally generates the motion pattern. Then, the CPU 311 defines the motions of the feet, the ZMP trajectory, the motion of the trunk, the motions of the upper limbs, the horizontal position and the height of the waist and so on according to the specified motion pattern and transfers the command values that specify the motions conforming to the definitions to the actuators 350.

Additionally, the CPU 311 can adaptively control the coordinated motions of the whole body of the robot apparatus 1 by detecting the posture and the inclination of the trunk unit 202 of the robot apparatus 1 by means of the output signal of the attitude sensor 351 and also detecting if each of the leg units 205R/L is in an idle state or in a standing state according to the output signals of the ground touch confirmation sensors 352, 353. Additionally, the CPU 311 controls the attitude and the motions of the robot apparatus 1 so as to make the ZMP position to be constantly directed toward the center of the ZMP stability region.

The motion control module 300 feeds back the extent to which the behavior of the robot apparatus 1 is realized according to the will decided by the thinking control module 200, or the status of the processes that are being executed currently, to the thinking control module 200. In this way, the robot apparatus 1 can judge the situation of itself and that of the surrounding and behave autonomously according to the control program.

It should be understood by those skilled in the art that various modifications, combinations, sub-combinations and alterations may occur depending on design requirements and other factors insofar as they are within the scope of the appended claims or the equivalents thereof.

What is claimed is:

1. An obstacle avoiding apparatus to be used for a mobile robot apparatus to avoid obstacles, the apparatus comprising:
  obstacle environment map drawing means for
    dividing a range of height from a reference surface for the mobile robot apparatus to move thereon to a total height of the mobile robot apparatus into a plurality of layers, wherein each layer corresponds to a predetermined respective range of height and
    drawing a plurality of obstacle environment maps, wherein each map shows an area occupied by one or more than one obstacles existing in the corresponding layer; and
  route planning means for planning a route for the robot apparatus to move along according to an enlarged environment map prepared by enlarging the area occupied by the obstacle or obstacles in the obstacle environment maps, the enlarging of the area occupied being done as a function of the cross sectional profile of the mobile robot apparatus in each of the layers, wherein:
    the mobile robot apparatus is modeled by means of a plurality of cylinders that correspond respectively to the predetermined ranges of height and have a length perpendicular to the reference surface so that each cylinder shares a common center axis.

2. The apparatus according to claim 1, wherein the route planning means plans the route by superposing a plurality of enlarged environment maps.

3. The apparatus according to claim 1, wherein the obstacle environment maps of the layer containing the reference surface shows a position lower than the reference surface as obstacle.

4. The apparatus according to claim 1, further comprising:
acquisition means for acquiring three-dimensional position information of the environment containing the obstacle or obstacles; and
obstacle environment map updating means for updating the obstacle environment maps of the predetermined layers according to the height indicated by the three-dimensional position information acquired by the acquisition means.

5. The apparatus according to claim 4, further comprising:
image pickup means for acquiring the three-dimensional position information,
the obstacle environment map updating means being adapted to update predetermined regions in the obstacle environment maps according to the imaged area of each layer picked up by the image pickup means.

6. An obstacle avoiding method to be used for a mobile robot apparatus to avoid obstacles, the method comprising:
by a CPU,
dividing a range of height from a reference surface for the mobile robot apparatus to move thereon to a total height of the mobile robot apparatus into a plurality of layers, wherein each layer corresponds to a predetermined respective range of height and
drawing a plurality of obstacle environment maps, wherein each map shows an area occupied by one or more than one obstacles existing in the corresponding layer; and
by a CPU, planning a route for the robot apparatus to move along according to an enlarged environment map prepared by enlarging the area occupied by the obstacle or obstacles in the obstacle environment maps, the enlarging of the area occupied being done as a function of the cross sectional profile of the mobile robot apparatus in each of the layers, wherein:
the mobile robot apparatus is modeled by means of a plurality of cylinders that correspond respectively to the predetermined ranges of height and have a length perpendicular to the reference surface so that each cylinder shares a common center axis.

7. A non-transitory computer-readable medium storing an obstacle avoiding program to be used for a mobile robot apparatus to avoid obstacles, the non-transitory computer-readable medium comprising instructions for instructing a computer to:
divide, by a CPU, a range of height from a reference surface for the mobile robot apparatus to move thereon to a total height of the mobile robot apparatus into a plurality of layers, wherein each layer corresponds to a predetermined respective range of height and
drawing, by a CPU, a plurality of obstacle environment maps, wherein each map shows an area occupied by one or more than one obstacles existing in the corresponding layer; and
plan, by a CPU, a route for the robot apparatus to move along according to an enlarged environment map prepared by enlarging the area occupied by the obstacle or obstacles in the obstacle environment maps, the enlarging of the area occupied being done as a function of the cross sectional profile of the mobile robot apparatus in each of the layers, wherein:
the mobile robot apparatus is modeled by means of a plurality of cylinders that correspond respectively to the predetermined ranges of height and have a length perpendicular to the reference surface so that each cylinder shares a common center axis.

8. A mobile robot apparatus adapted to avoid obstacles, the robot apparatus comprising:
obstacle environment map drawing means for
dividing a range of height from a reference surface for the mobile robot apparatus to move thereon to a total height of the mobile robot apparatus into a plurality of layers, wherein each layer corresponds to a predetermined respective range of height and
drawing a plurality of obstacle environment maps, wherein each map shows an area occupied by one or more than one obstacles existing in the corresponding layer; and
route planning means for planning a route for the mobile robot apparatus to move along according to an enlarged environment map prepared by enlarging the area occupied by the obstacle or obstacles in the obstacle environment maps, the enlarging of the area occupied being done as a function of the cross sectional profile of the mobile robot apparatus in each of the layers, wherein:
the mobile robot apparatus is modeled by means of a plurality of cylinders that correspond respectively to the predetermined ranges of height and have a length perpendicular to the reference surface so that each cylinder shares a common center axis.

9. An obstacle avoiding apparatus to be used for a mobile robot apparatus to avoid obstacles, the apparatus comprising:
an obstacle environment map drawing section that, by CPU,
divides a range of height from a reference surface for the mobile robot apparatus to move thereon to a total height of the mobile robot apparatus into a plurality of layers, wherein each layer corresponds to a predetermined respective range of height and
draws a plurality of obstacle environment maps, wherein each map shows an area occupied by one or more than one obstacles existing in the corresponding layer; and
a route planning section that, by CPU, plans a route for the robot apparatus to move along according to an enlarged environment map prepared by enlarging the area occupied by the obstacle or obstacles in the obstacle environment maps, the enlarging of the area occupied being done as a function of the cross sectional profile of the mobile robot apparatus in each of the layers, wherein:
the mobile robot apparatus is modeled by means of a plurality of cylinders that correspond respectively to the predetermined ranges of height and have a length perpendicular to the reference surface so that each cylinder shares a common center axis.

10. A mobile robot apparatus adapted to avoid obstacles, the robot apparatus comprising:
an obstacle environment map drawing section that, by CPU,
divides a range of height from a reference surface for the mobile robot apparatus to move thereon to a total height of the mobile robot apparatus into a plurality of layers, wherein each layer corresponds to a predetermined respective range of height and draws a plurality of obstacle environment maps, wherein each map shows an area occupied by one or more than one obstacles existing in the corresponding layer; and a route planning section that, by CPU, plans a route for the mobile robot apparatus to move along according to an enlarged environment map prepared by enlarging the area occupied by the obstacle or obstacles in the obstacle environment maps, the enlarging of the area occupied being done as a function of the cross sectional profile of the mobile robot apparatus in each of the layers, wherein:

the mobile robot apparatus is modeled by means of a plurality of cylinders that correspond respectively to the predetermined ranges of height and have a length perpendicular to the reference surface so that each cylinder shares a common center axis.

11. The apparatus according to claim 1, wherein each of the obstacle environment maps is divided into a plurality of cells, and wherein showing an area occupied by one or more than one obstacles existing in the corresponding layer includes showing in which cell or cells any obstacle or obstacles existing in the corresponding layer is or are located.

12. The apparatus according to claim 1, wherein each of the obstacle environment maps is divided into a plurality of cells and an obstacle is deemed to exist in any given cell if an obstacle occupancy probability in the corresponding layer for that cell exceeds a threshold value.

13. The apparatus according to claim 12, wherein the occupancy probability is updated by an empty process or an occupied process executed on each cell using the Bayes' update rule, and wherein the empty process reduces the occupancy probability and the occupied process raises the occupancy probability.

14. The apparatus according to claim 12, wherein the occupancy probability is updated statistically without overwriting so as to render the obstacle environment maps robust to noise.

15. The apparatus according to claim 13, wherein a near region and a far region are defined in each of the plurality of layers as a function of the distance from the mobile robot apparatus, and the occupancy probability may not be updated by an empty process in the far region defined in the layer corresponding to the reference surface for the mobile robot apparatus to move thereon.

16. The apparatus according to claim 15, wherein a size of the near region in one layer is different than a size of the near region in a different layer.

17. The apparatus according to claim 16, wherein a size of the far region in one layer is different than a size of the far region in a different layer.

18. The method according to claim 6, further comprising dividing, by a CPU, the obstacle environment maps into a plurality of cells, and wherein showing an area occupied by one or more than one obstacles existing in the corresponding layer includes showing in which cell or cells any obstacle or obstacles existing in the corresponding layer is or are located.

19. The apparatus according to claim 8, wherein each of the obstacle environment maps is divided into a plurality of cells, and wherein showing an area occupied by one or more than one obstacles existing in the corresponding layer includes showing in which cell or cells any obstacle or obstacles existing in the corresponding layer is or are located.

* * * * *